(12) United States Patent
Daudet

(10) Patent No.: US 10,724,229 B2
(45) Date of Patent: Jul. 28, 2020

(54) SLIP CLIP

(71) Applicant: Simpson Strong-Tie Company, Inc., Pleasanton, CA (US)

(72) Inventor: Larry Randall Daudet, Brentwood, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 15/694,623

(22) Filed: Sep. 1, 2017

(65) Prior Publication Data
US 2018/0066424 A1 Mar. 8, 2018

Related U.S. Application Data

(60) Provisional application No. 62/382,778, filed on Sep. 2, 2016.

(51) Int. Cl.
*E04B 1/41* (2006.01)
*E04B 1/26* (2006.01)
(Continued)

(52) U.S. Cl.
CPC .............. *E04B 1/40* (2013.01); *E04B 1/2403* (2013.01); *E04B 1/2608* (2013.01); *E04B 2/768* (2013.01); *E04B 2001/2415* (2013.01); *E04B 2001/2439* (2013.01); *E04B 2001/2448* (2013.01); *E04B 2001/405* (2013.01); *F16B 37/0842* (2013.01); *F16B 39/02* (2013.01); *F16B 39/10* (2013.01)

(58) Field of Classification Search
CPC . E04B 1/2403; E04B 1/36; E04B 2/88; E04B 1/98; E04B 1/40; E04B 2001/2415; E04B 2001/2439; E04B 2001/405; F16M 13/02
See application file for complete search history.

(56) References Cited

U.S. PATENT DOCUMENTS 1,729,935 A   10/1929  Froehlich
2,065,529 A   12/1936  Kehr et al.
(Continued)

FOREIGN PATENT DOCUMENTS

DE        2509267        6/1976
DE   2013/210723 A1    12/2014
(Continued)

OTHER PUBLICATIONS

Schafer, B.W. et al., "Accommodating Building Deflections: What every EOR should know about accommodating deflections in secondary cold-formed steel systems." NCSEA/CASE/SEI, STRUCTURE Magazine, Apr. 2003, 10 pages, Chicago, IL.
(Continued)

*Primary Examiner* — Rodney Mintz
(74) *Attorney, Agent, or Firm* — James R. Cypher; Charles R. Cypher

(57) ABSTRACT

An improved connection between supporting and supported structural members, particularly between the sheathing and framing members of curtain walls, wherein the connector is an angular member having first and second plates joined at an angular junction and the second plate is formed with a plurality of elongated slots and the fastening in the elongated slot closest to the angular juncture is reinforced.

19 Claims, 31 Drawing Sheets

(51) Int. Cl.
  *E04B 2/76* (2006.01)
  *E04B 1/24* (2006.01)
  *F16B 39/02* (2006.01)
  *F16B 37/08* (2006.01)
  *F16B 39/10* (2006.01)
  *E04B 1/38* (2006.01)

(56) References Cited

U.S. PATENT DOCUMENTS

| | | | |
|---|---|---|---|
| 2,218,426 A | 10/1940 | Hurlbert, Jr. | |
| 2,365,478 A | 12/1944 | Grotta | |
| 3,003,600 A | 10/1961 | MacKenzie | |
| 3,038,568 A | 6/1962 | Morgan | |
| 3,321,880 A | 5/1967 | Ferrell et al. | |
| 3,490,797 A | 1/1970 | Platte | |
| 3,537,219 A | 11/1970 | Navarre | |
| 3,715,850 A | 2/1973 | Chambers | |
| 3,798,865 A | 3/1974 | Curtis | |
| 3,805,465 A | 4/1974 | Dietrich | |
| 3,972,168 A | 8/1976 | Allen | |
| 4,067,168 A | 1/1978 | Thurner | |
| 4,121,391 A | 10/1978 | Schroeder | |
| 4,140,294 A | 2/1979 | Zwarts | |
| 4,433,524 A | 2/1984 | Matson | |
| 4,570,400 A | 2/1986 | Slager et al. | |
| 4,594,017 A | 6/1986 | Hills | |
| 4,665,672 A | 5/1987 | Commins et al. | |
| 4,717,279 A | 1/1988 | Commins | |
| 4,796,403 A | 1/1989 | Fulton et al. | |
| 4,819,401 A | 4/1989 | Whitney, Jr. | |
| 4,825,621 A | 5/1989 | Jensen | |
| 4,843,776 A | 7/1989 | Guignard | |
| 4,890,436 A | 1/1990 | Colonias | |
| 4,897,979 A | 2/1990 | Colonias | |
| 4,917,403 A | 4/1990 | Gyoda et al. | |
| 4,932,173 A | 6/1990 | Commins | |
| 4,936,182 A | 6/1990 | Bunker | |
| 4,949,929 A * | 8/1990 | Kesselman | A47B 96/06 248/220.1 |
| 4,967,929 A | 11/1990 | Turner | |
| 5,027,494 A | 7/1991 | Martin | |
| 5,048,243 A * | 9/1991 | Ward | E04B 1/98 52/167.4 |
| 5,092,097 A | 3/1992 | Young | |
| 5,113,631 A | 5/1992 | diGirolamo | |
| 5,127,760 A | 7/1992 | Brady | |
| 5,216,858 A | 6/1993 | Gilmour | |
| 5,249,404 A | 10/1993 | Leek et al. | |
| 5,259,685 A | 11/1993 | Gilb | |
| 5,265,396 A | 11/1993 | Amimoto | |
| 5,313,752 A | 5/1994 | Hatzinikolas | |
| 5,323,577 A | 6/1994 | Whitmyer | |
| 5,328,287 A | 7/1994 | Gilb | |
| 5,333,435 A | 8/1994 | Leek | |
| 5,402,612 A | 4/1995 | diGirolamo | |
| 5,467,566 A * | 11/1995 | Swartz | E04B 2/96 52/235 |
| 5,467,570 A | 11/1995 | Leek | |
| 5,471,805 A | 12/1995 | Becker | |
| 5,555,694 A | 9/1996 | Commins | |
| 5,572,844 A | 11/1996 | Stackenwalt et al. | |
| 5,577,860 A | 11/1996 | Plank | |
| 5,611,179 A | 3/1997 | Leek | |
| 5,640,823 A | 6/1997 | Bergeron et al. | |
| 5,664,392 A * | 9/1997 | Mucha | E04B 2/96 248/262 |
| 5,671,580 A | 9/1997 | Chou | |
| 5,689,922 A | 11/1997 | Daudet | |
| 5,720,465 A | 2/1998 | Peltzer | |
| 5,720,571 A * | 2/1998 | Frobosilo | E04B 2/96 403/2 |
| 5,755,066 A | 5/1998 | Becker | |
| 5,846,018 A * | 12/1998 | Frobosilo | E04B 2/96 403/2 |
| 5,876,006 A * | 3/1999 | Sharp | E04B 1/2403 248/297.21 |
| 5,904,023 A | 5/1999 | diGirolamo et al. | |
| 5,906,080 A * | 5/1999 | diGirolamo | E04B 2/7453 411/546 |
| 5,913,788 A | 6/1999 | Herren | |
| 5,937,605 A | 8/1999 | Wendt | |
| 5,979,130 A | 11/1999 | Gregg et al. | |
| 5,983,589 A | 11/1999 | Daudet | |
| 6,058,668 A | 5/2000 | Herren | |
| 6,088,982 A | 7/2000 | Hiesberger | |
| 6,112,495 A | 9/2000 | Gregg et al. | |
| 6,158,188 A | 12/2000 | Shahnazarian | |
| 6,199,929 B1 | 3/2001 | Hansch | |
| 6,213,679 B1 * | 4/2001 | Frobosilo | E04B 2/82 403/14 |
| 6,230,466 B1 | 5/2001 | Pryor | |
| 6,301,854 B1 | 10/2001 | Daudet et al. | |
| 6,430,890 B1 | 8/2002 | Chiwhane et al. | |
| D467,007 S | 12/2002 | Daudet et al. | |
| 6,591,562 B2 | 7/2003 | Ting | |
| 6,598,361 B2 | 7/2003 | Ting | |
| 6,612,087 B2 * | 9/2003 | diGirolamo | E04B 2/767 403/403 |
| 6,668,510 B2 | 12/2003 | McManus | |
| 6,688,069 B2 * | 2/2004 | Zadeh | E04B 1/2403 52/712 |
| 6,691,482 B1 | 2/2004 | Ault | |
| 6,698,971 B1 | 3/2004 | Wilhelmi | |
| 6,701,689 B2 | 3/2004 | diGirolamo | |
| 6,719,481 B2 | 4/2004 | Hoffmann | |
| 6,748,705 B2 | 6/2004 | Orszulak et al. | |
| 6,792,733 B2 | 9/2004 | Wheeler et al. | |
| 6,799,407 B2 | 10/2004 | Saldana | |
| 6,843,035 B1 | 1/2005 | Glynn | |
| 6,854,237 B2 | 2/2005 | Surowiecki | |
| 6,871,470 B1 | 3/2005 | Stover | |
| 6,883,785 B1 | 4/2005 | Knapp | |
| 7,104,024 B1 * | 9/2006 | diGirolamo | E04B 2/767 403/231 |
| RE39,462 E | 1/2007 | Brady | |
| 7,174,690 B2 * | 2/2007 | Zadeh | E04B 1/2403 52/712 |
| 7,225,590 B1 | 6/2007 | diGirolamo et al. | |
| 7,293,393 B2 | 11/2007 | Kelly et al. | |
| 7,299,593 B1 | 11/2007 | diGirolamo et al. | |
| 7,451,573 B2 | 11/2008 | Orszulak et al. | |
| 7,478,508 B2 * | 1/2009 | Peterson | E04B 2/96 248/300 |
| 7,503,150 B1 * | 3/2009 | diGirolamo | E04B 2/96 403/403 |
| 7,520,100 B1 | 4/2009 | Herrman et al. | |
| 7,533,508 B1 * | 5/2009 | diGirolamo | E04B 2/58 248/300 |
| 7,559,519 B1 | 7/2009 | Dragic et al. | |
| 7,596,921 B1 | 10/2009 | diGirolamo et al. | |
| 7,617,643 B2 | 11/2009 | Pilz et al. | |
| 7,634,889 B1 | 12/2009 | diGirolamo et al. | |
| 7,640,701 B2 | 1/2010 | Rutherford | |
| 7,644,549 B2 | 1/2010 | Speck | |
| 7,681,365 B2 | 3/2010 | Klein | |
| 7,716,899 B2 | 5/2010 | Beck et al. | |
| 7,735,295 B2 | 6/2010 | Surowiecki | |
| 7,739,850 B2 | 6/2010 | Daudet | |
| 7,752,817 B2 | 7/2010 | Pilz et al. | |
| 7,788,878 B1 | 9/2010 | diGirolamo et al. | |
| D644,503 S * | 9/2011 | Crane | D8/354 |
| 8,091,316 B2 | 1/2012 | Beck et al. | |
| 8,181,419 B1 * | 5/2012 | diGirolamo | E04B 2/768 248/909 |
| 8,387,321 B2 | 3/2013 | diGirolamo | |
| 8,511,032 B2 * | 8/2013 | Abdel-Rahman | E04B 2/88 248/228.1 |
| 8,555,592 B2 * | 10/2013 | Daudet | E04B 1/2403 52/489.1 |
| 9,032,681 B1 * | 5/2015 | Brady | E04B 1/41 52/404.1 |
| 9,115,489 B2 * | 8/2015 | Bourdon | E04B 2/90 |

(56) References Cited

U.S. PATENT DOCUMENTS

| | | | | |
|---|---|---|---|---|
| 9,140,000 | B1* | 9/2015 | Brady | E04B 1/41 |
| 10,087,617 | B2* | 10/2018 | Daudet | E04B 1/2403 |
| 2002/0023405 | A1* | 2/2002 | Zadeh | E04B 1/2403 52/714 |
| 2002/0062617 | A1* | 5/2002 | diGirolamo | E04B 2/767 52/688 |
| 2004/0118075 | A1* | 6/2004 | Zadeh | E04B 1/2403 52/715 |
| 2005/0086905 | A1 | 4/2005 | Ralph et al. | |
| 2006/0032180 | A1* | 2/2006 | Peterson | E04B 2/96 52/712 |
| 2006/0096192 | A1 | 5/2006 | Daudet | |
| 2006/0185311 | A1* | 8/2006 | Attalla | E04B 7/045 52/639 |
| 2006/0260259 | A1 | 11/2006 | Morse | |
| 2009/0173036 | A1 | 7/2009 | Hand | |
| 2009/0193750 | A1* | 8/2009 | Klima | E04B 2/96 52/712 |
| 2010/0126103 | A1 | 5/2010 | diGirolamo | |
| 2012/0247059 | A1* | 10/2012 | Daudet | E04B 1/2403 52/705 |
| 2013/0139466 | A1* | 6/2013 | Abdel-Rahman | E04B 2/88 52/655.1 |
| 2015/0068153 | A1* | 3/2015 | Bourdon | E04B 2/90 52/702 |
| 2015/0159369 | A1 | 6/2015 | Chen et al. | |
| 2017/0044787 | A1* | 2/2017 | di Girolamo | E04H 9/021 |
| 2017/0204599 | A1* | 7/2017 | Daudet | E04B 1/2403 |
| 2017/0204600 | A1* | 7/2017 | Daudet | E04B 1/2403 |
| 2018/0044910 | A1* | 2/2018 | Lastowski | E04B 1/40 |

FOREIGN PATENT DOCUMENTS

| | | |
|---|---|---|
| WO | WO 96/31667 A1 | 10/1996 |
| WO | WO 98/51889 | 11/1998 |

OTHER PUBLICATIONS

"International Search Report and The Written Opinion of the International Searching Authority," PCT/US2012/030963, dated Jul. 30, 2012, 6 pages.
"Curtainwall Deflection Solutions," Super Stud Building Products, Inc. Product Catalog, 2001, 24 pages including front cover. Super Stud Building Products, Inc., Edison.
"Redi Klip Submittal: Head-of-Wall Positive Attachment Deflection Clip," Total Steel Solution, as early as May 22, 2013, 2 pages, USA.
"Posi Klip Product Information: Head-of-Wall Positive Attachment Deflection Clip," FireTrak Corporation, as early as May 22, 2013, 1 page, USA.
"Sliptrack Systems: Slotted Deflections Track Systems for Interior and Exterior Walls," SlipTrack Systems, 2003, 6 pages. Dietrich Metal Framing: A Worthington Industries Company, USA.
"TSN Products: Steel framing products," The Steel Network TSN website, 2010, 2 pages. The Steel Network, Inc., USA.
"TSN Product: VertiClip® SLB," The Steel Network TSN website, Dec. 26, 2012, 2 pages, The Steel Network, Inc., USA.
"Priceless Steel Products Clip Central," Priceless Steel Products Website, Aug. 30, 2010, 2 pages. Scafco Steel Stud Manufacturing Co., WA.
"Bypass Slab Slip Clip: PLC2," Priceless Steel Product Catalog, as early as May 22, 2013, p. 12-13. Scafco Steel Stud Manufacturing Co., WA.
"SLP-TRK® Slotted Track (BDTK)," "Head of Wall," SlipTrack Systems, as early as Jul. 2010, p. 26-29. Dietrich Metal Framing: A Worthington Industries Company, USA.
"Curtainwall Deflection Solutions," Buy Super Stud Website, Aug. 2010, 2 pages. Super Stud Building Products, Inc., Edison.
"Curtain Wall Systems", "Jam Stud Introduction", "Design Considerations", "Header/Sill Solutions", "Connections", "VertiClip: Vertical Deflection Connectors", "DriftClip and DriftTrk: Vertical Deflection and Lateral Drift", "Bridging", "Design Software," TSN The Steel Network Product Catalog, May 2009, cover page, p. 1, 4, 18, 30-33, 35, 36, back cover. The Steel Network, Inc., USA.
Search Report for European Patent Appl. 17152308.7, dated Aug. 17, 2017, 9 pages, European Patent Office, Munich, Germany.
"DWSC Seismic Clip," Brochure, as early as Aug. 21, 2014, 1 page, Marino\WARE, South Plainfield, New Jersey.
"Single Slip Clip Detail," Disclosure, Aug. 12, 2011, 1 page, Olmar Supply Inc., Livermore, California.
"Double Slip Clip Detail," Disclosure, Aug. 12, 2011, 1 page, Olmar Supply Inc., Livermore, California.
Office Action dated Nov. 24, 2017 in U.S. Appl. No. 15/405,125. Patent prosecution document. Nov. 24, 2017. 15 pages. United States Patent and Trademark Office. Alexandria, Virginia.
International Search Report for Application No. PCT/US2017/049945, Patent Application Document, dated Dec. 13, 2017, 13 pages, European Patent Office, Rijswijk, Netherlands.

* cited by examiner

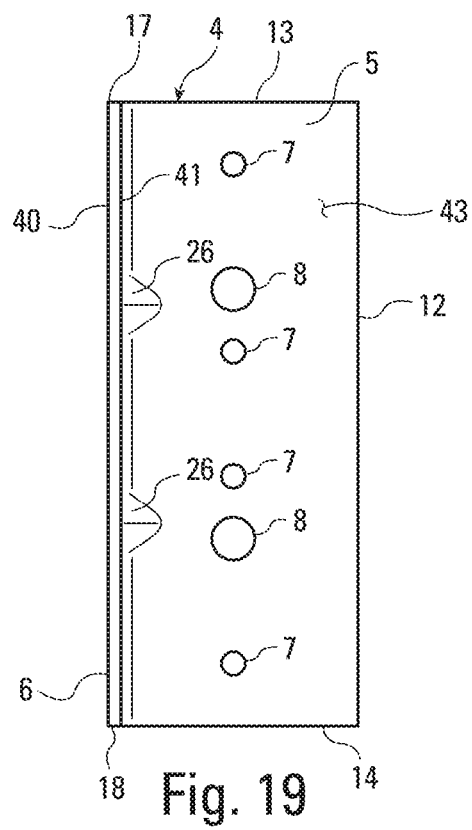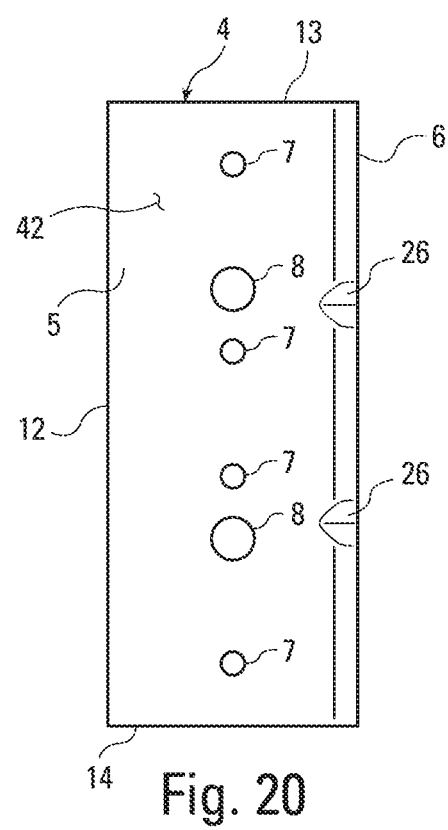

SLIP CLIP

BACKGROUND OF THE INVENTION

The present invention belongs to a class of stud mounting clips that are useful in the construction of buildings, particularly light commercial buildings.

Many buildings are constructed with steel stud wall systems. For a variety of reasons, it is often advantageous to construct these walls systems with connectors that permit a degree of relative movement between the framing members. Buildings often settle on their foundations once constructed. This can cause exterior walls to go out of plumb, in turn causing damage to the surrounding foundation and to interior structures such as floors. Exterior walls and frames, particularly in light commercial buildings, are often made from materials that have different coefficients of expansion than that of the structure's exterior sheathing. Exposure to extreme temperatures can produce gaps in the exterior sheathing if the panels expand or contract more than the framing. Gaps allow cold air and moisture to intrude. Exterior walls of buildings are also subject to deflection from wind or seismic forces, and a degree of freedom of movement can reduce stress and prevent fracture of connected parts. Furthermore, curtain walls are not designed to support vertical loads and must therefore by isolated from deflection of the primary load-bearing support structure of the building due to changes in live or dead loads carried by that structure.

There are a variety of patented slip clips that permit relative movement between structural members. U.S. Pat. Nos. 5,664,392, 6,612,087, 6,688,069 and 8,555,592 all teach metal slip clips with special reinforcing members such as flanges or embossments to strengthen the clip. U.S. Pat. Nos. 5,720,571 and 5,846,018 teach slip clips that use a rivet as the fastener on which sliding between the members occurs. U.S. Pat. Nos. 7,104,024 and 7,503,150 teach connecting sliding fasteners in separate slots with a u-shaped washer to strengthen the connection. U.S. Pat. No. 8,511,032 teaches using multiple sliding fasteners in a single slot.

The slip clip connector of the present invention has been designed to achieve strong load values while being inexpensive to manufacture. The present invention focuses on the fasteners anchoring the connector to the vertical member to improve the performance of the connection.

BRIEF SUMMARY OF THE INVENTION

The present invention provides a connection between a first structural member and a second structural member by means of an angled connector having first and second plates joined at an angled juncture. The first plate is connected to the first structural member. The second plate is joined to the second structural member by a plurality of fastenings that allow the second structural member to move relative to the first structural member a selected distance. The fastening of the angled connector to the second structural member closest to the angled juncture is reinforced.

The present invention provides an angled connector having elongated slots where the fastenings between the second structural member and the angled connector are formed.

In one embodiment, the present invention provides an angled connector having a plurality of elongated slots for connecting the second plate to the second structural member and the elongated slot closest to the juncture between the plates of the angled connector is dimensioned allow for the use of multiple fasteners in this slot while still providing the designed—for freedom of movement between the first and second structural members. According to the present invention, the elongated slot closest to the juncture can be bracketed by strengthening deformations in the plate that contains the slot. In the preferred embodiment, the strengthening deformations are embossments. Preferably, the elongated slots are of equal width.

In selected embodiments, the present invention also provides an angled connector where the one or more of the fasteners used to connect the connector to the vertical member is provided with a nut, weld or other lock member on the side of the fastener opposed to the head of the fastener to serve as a stop. In one embodiment of the present invention, the fastener closest to the juncture in the angle connector is reinforced by providing a washer between the head of the fastener and the second plate of the connector where the washer is an elongated member that also is disposed between the head of at least one more fastener and the second plate.

The angled connector of the present invention is made from light-gauge steel.

BRIEF DESCRIPTION OF THE DRAWINGS

FIG. 19 is left side view of the connector of FIG. 16.

FIG. 20 is a right side view of the connector of FIG. 16.

DETAILED DESCRIPTION OF THE INVENTION

Figure 8:
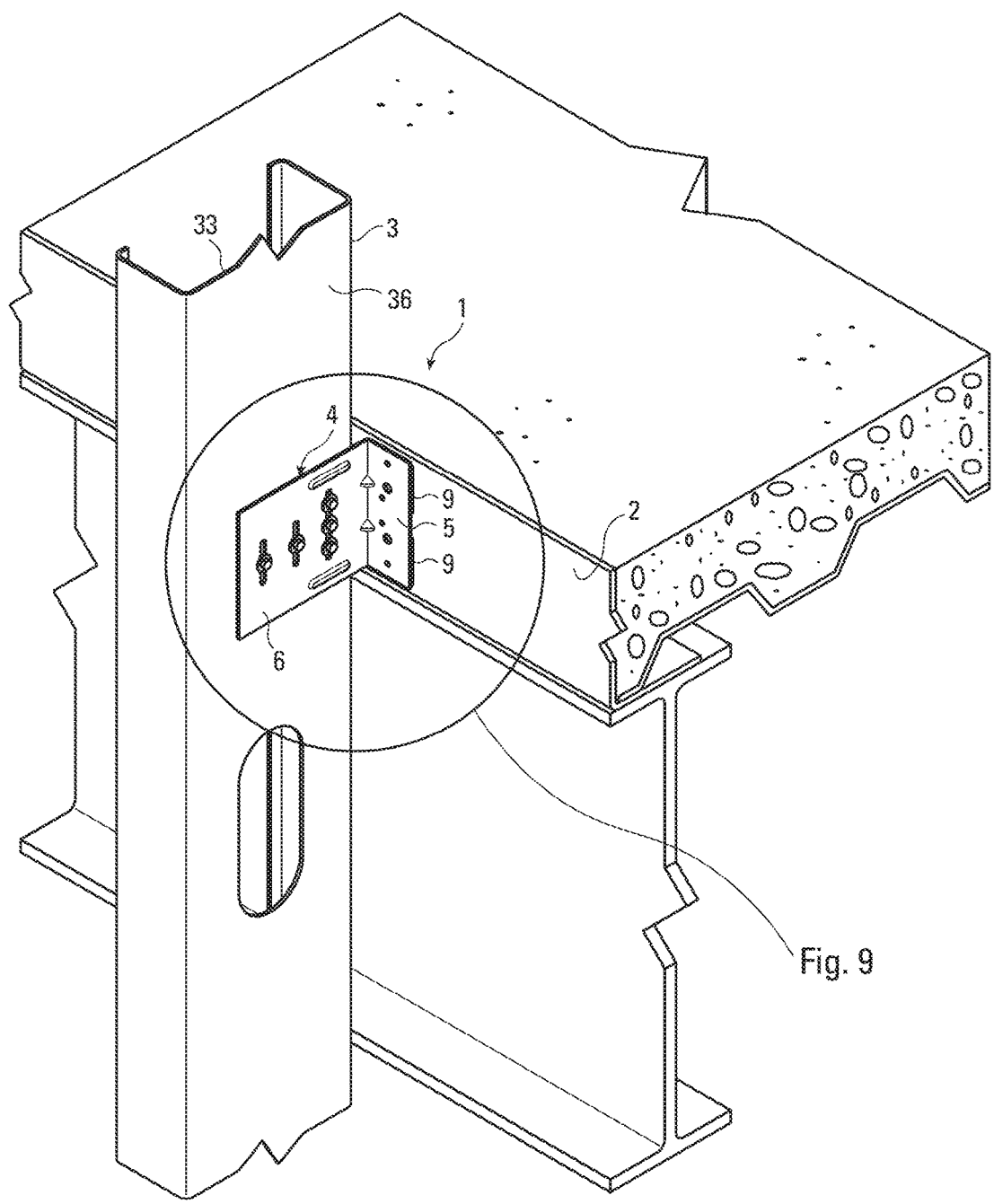
FIG. 8 is a perspective view of a wall stud to floor member connection formed according to the present invention.
Figure 9:
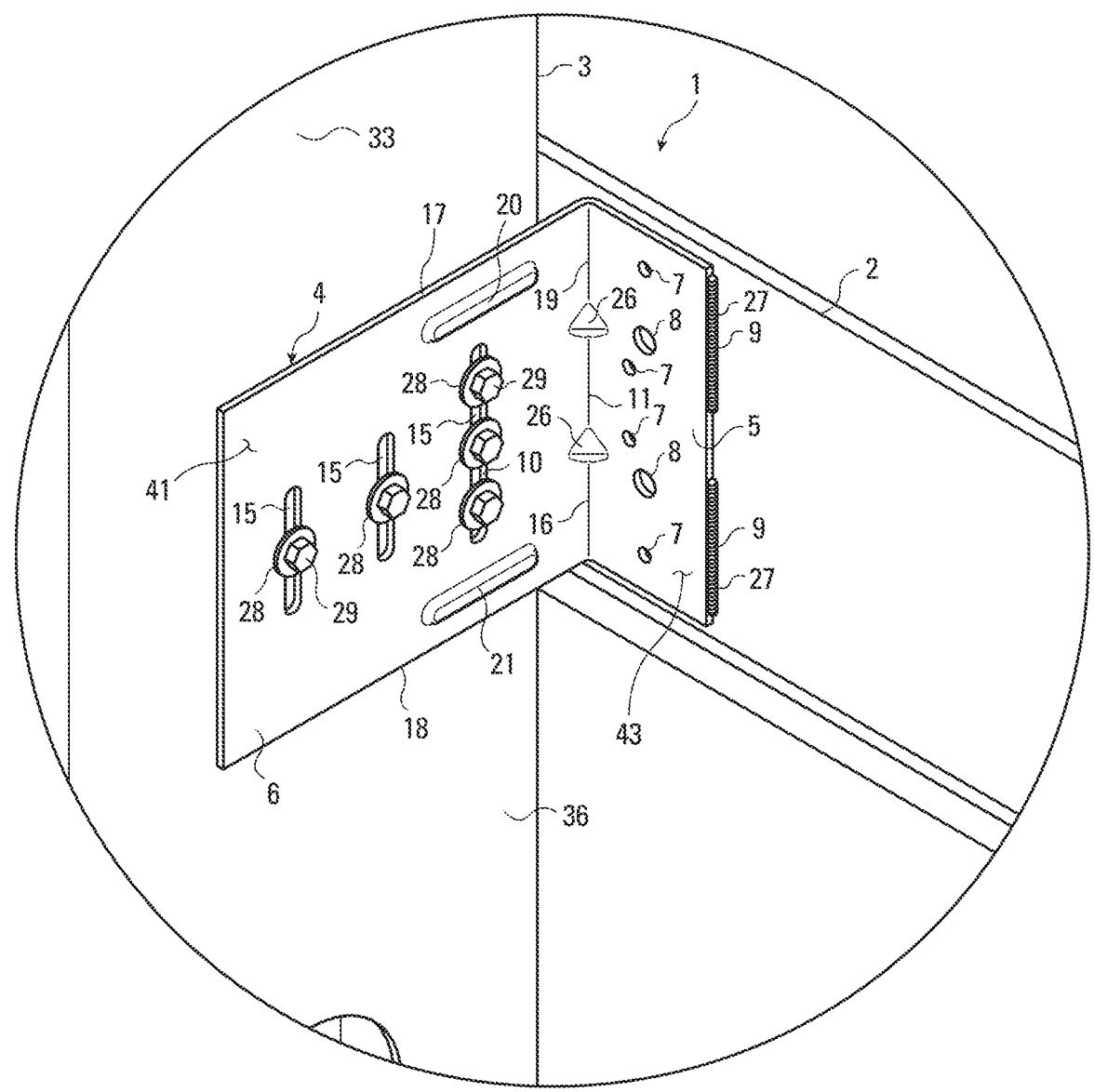
FIG. 9 is a close-up perspective view of the connection of FIG. 8.
Figure 10:
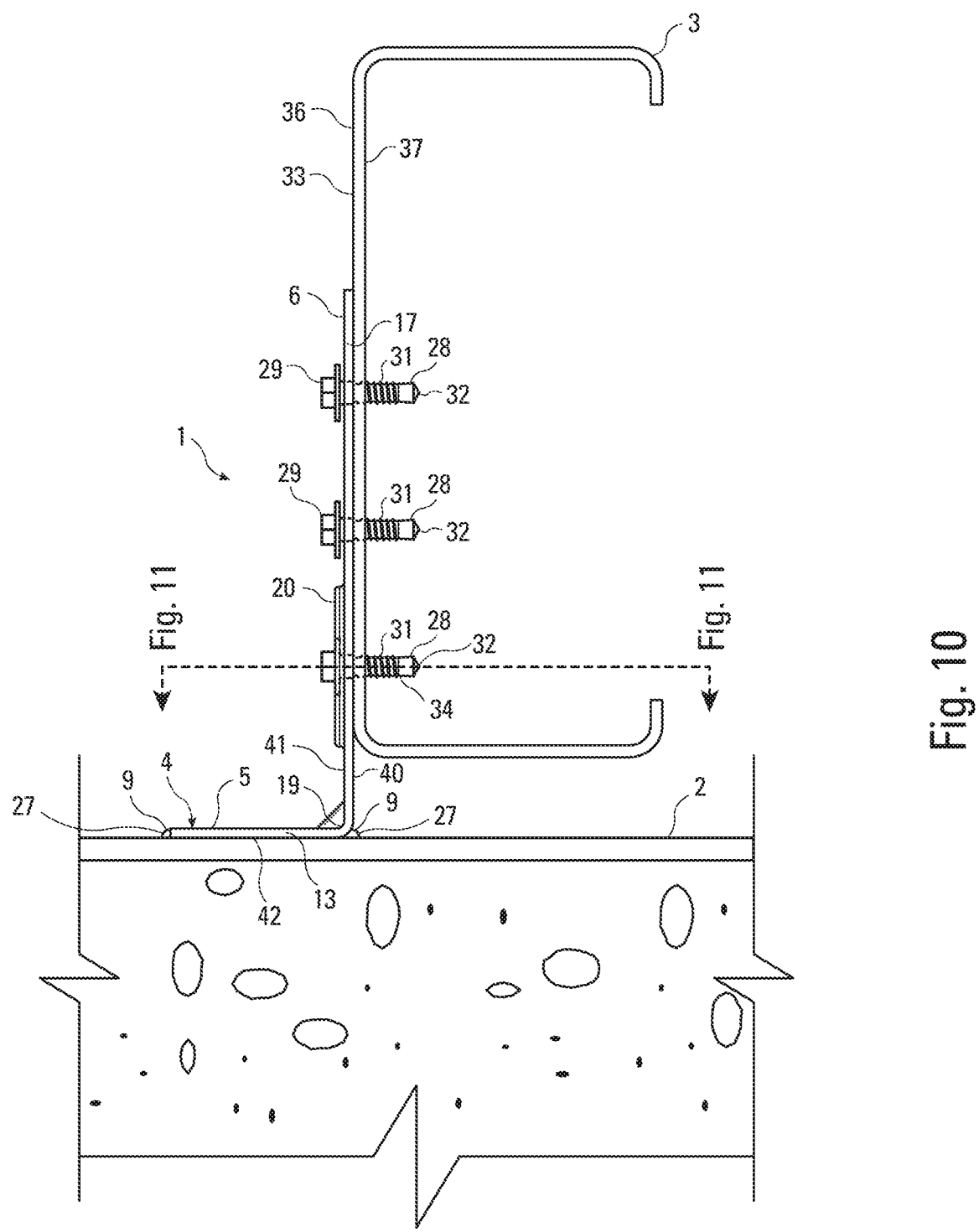
FIG. 10 is a top view of the connection shown in FIG. 8.
Figure 11:
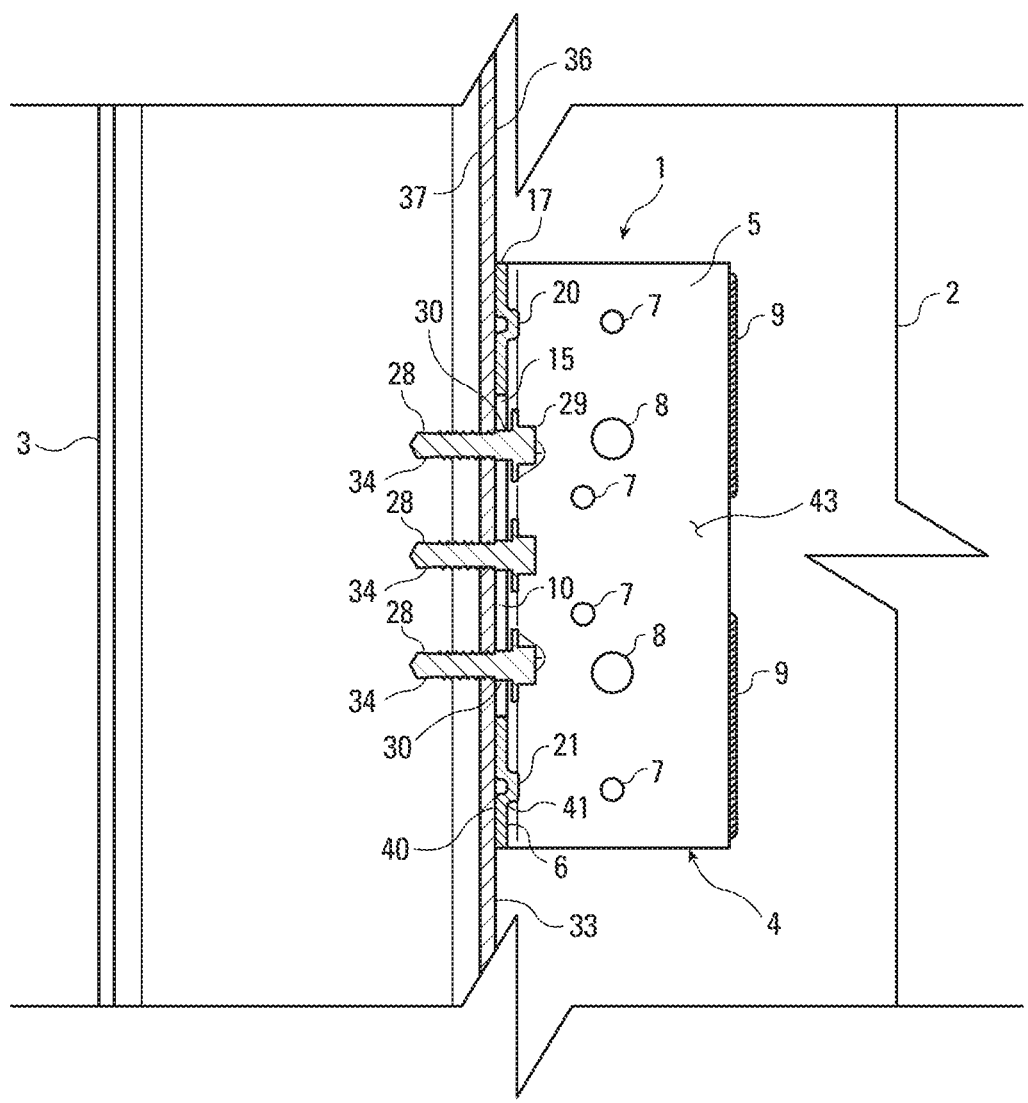
FIG. 11 is a cross-sectional side view of the connection shown in FIG. 8.
Figure 12:
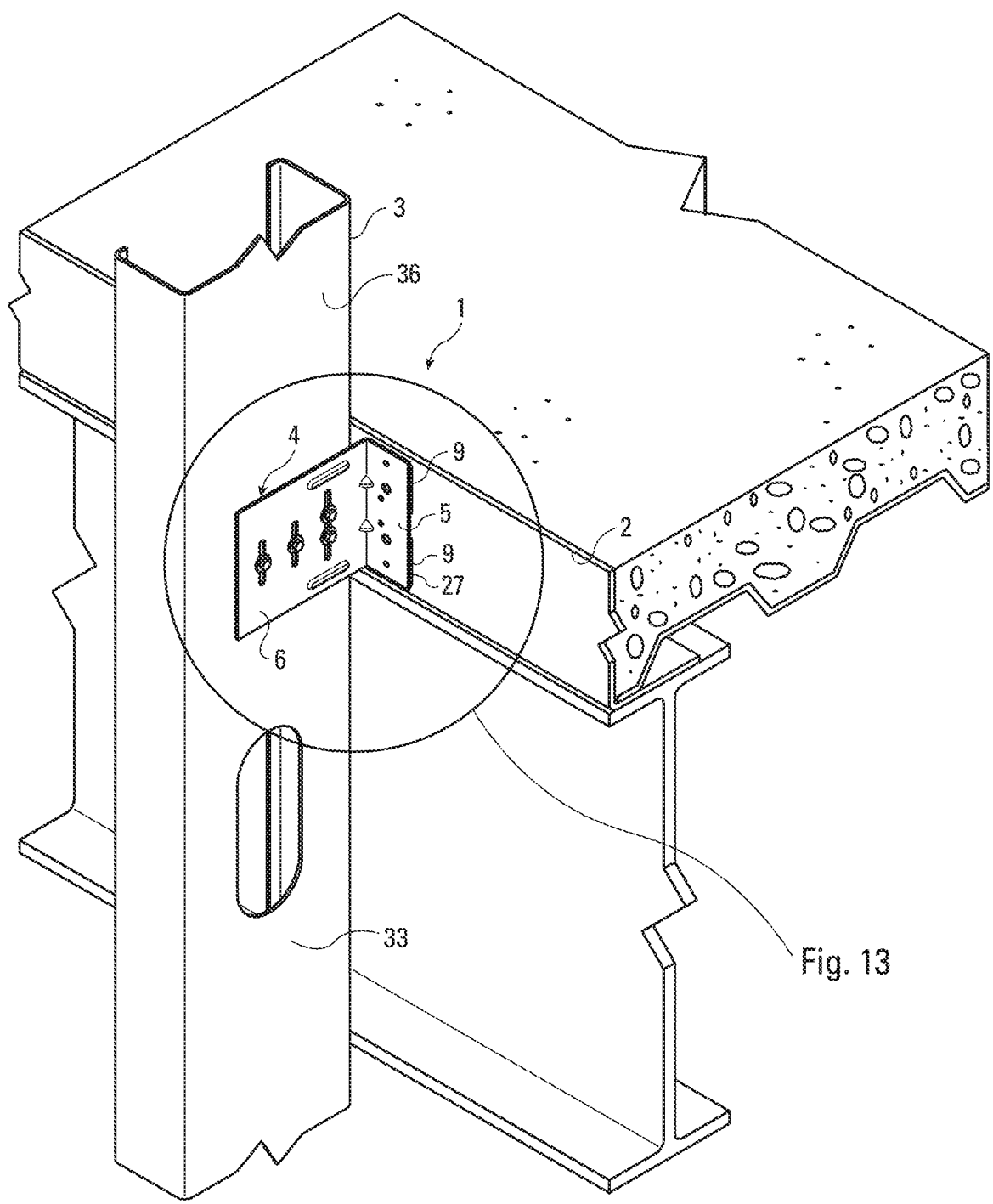
FIG. 12 is a perspective view of a wall stud to floor member connection formed according to the present invention.
Figure 13:
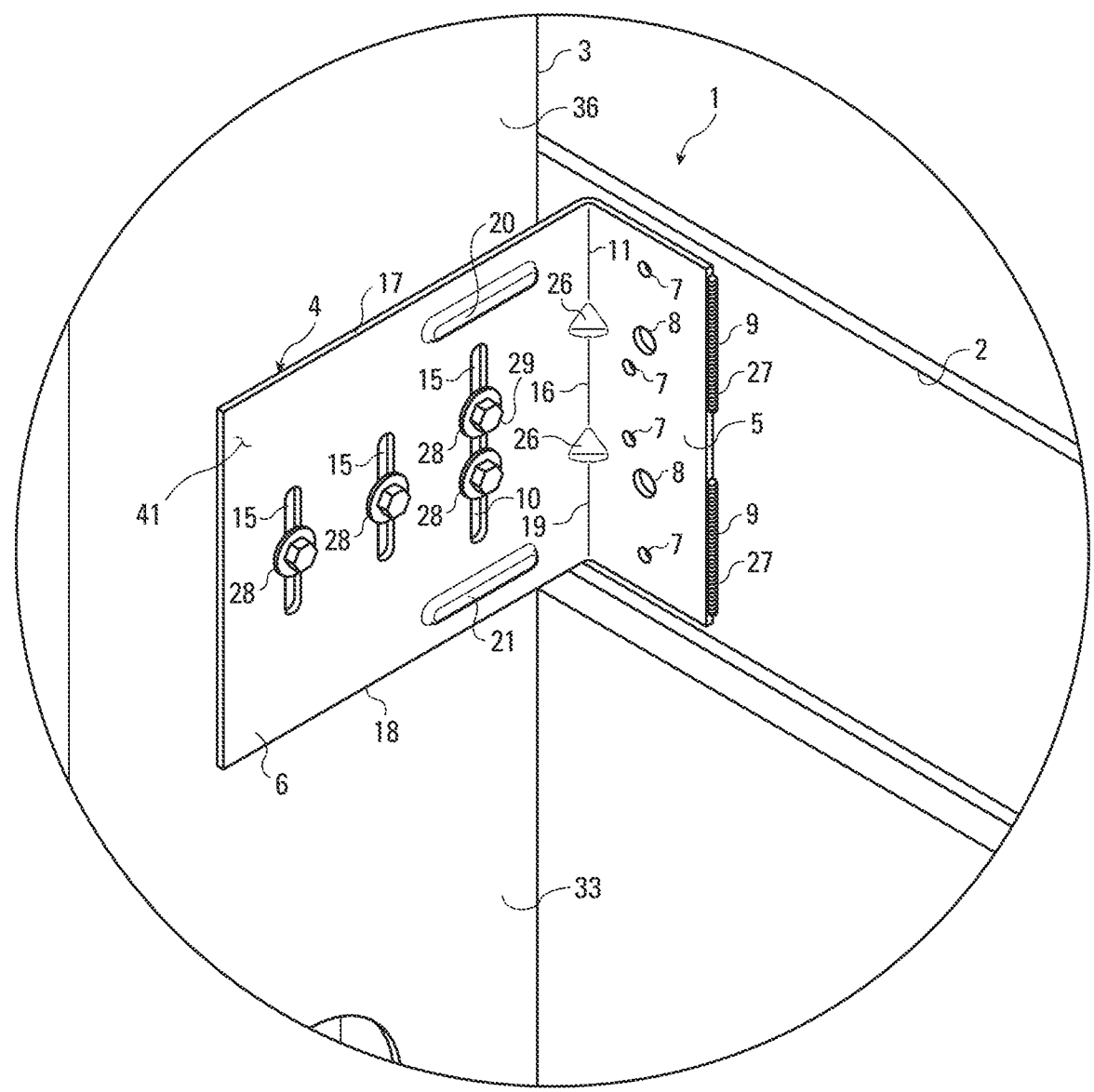
FIG. 13 is a close-up perspective view of the connection of FIG. 12.
Figure 14:
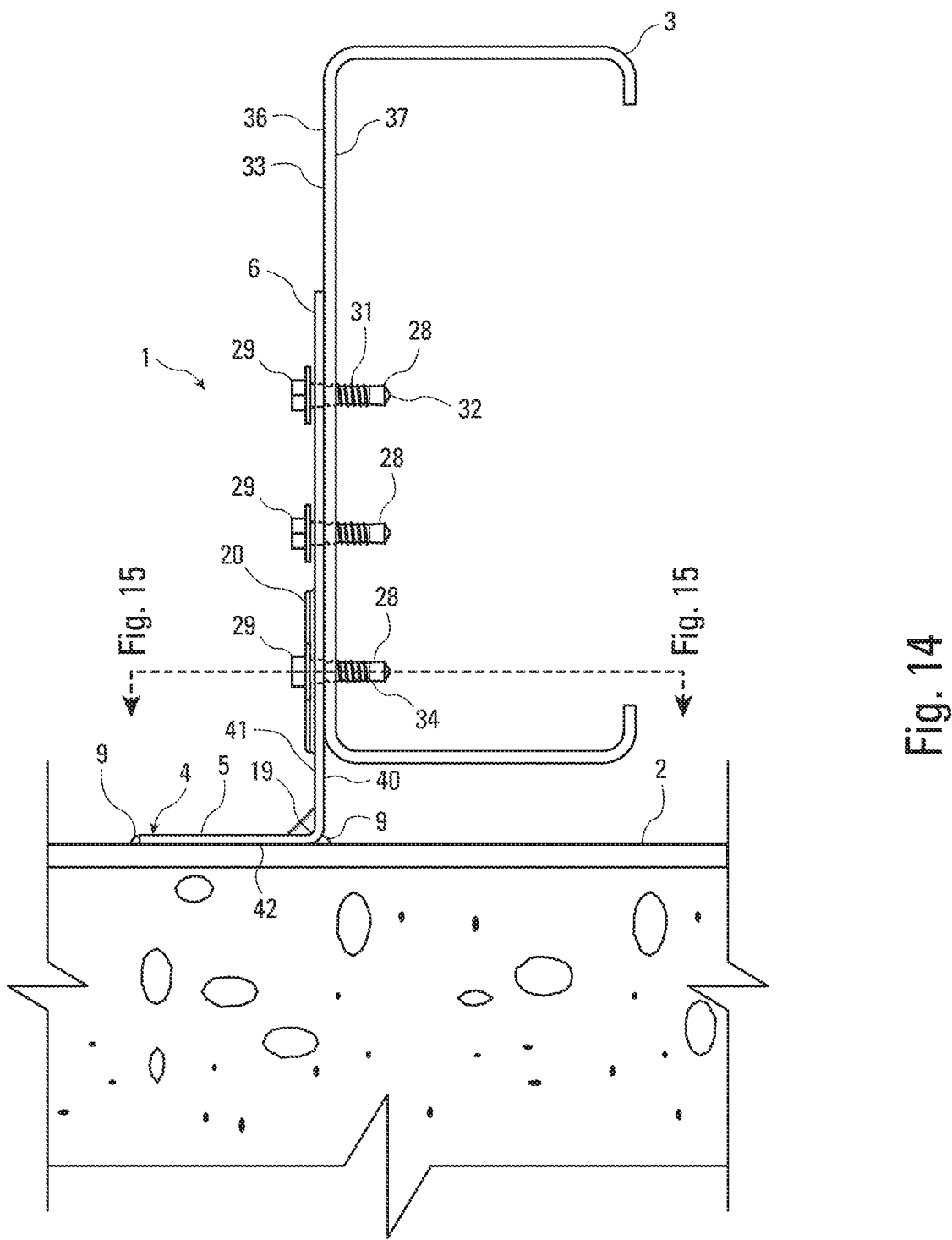
FIG. 14 is a top view of the connection shown in FIG. 12.
Figure 15:
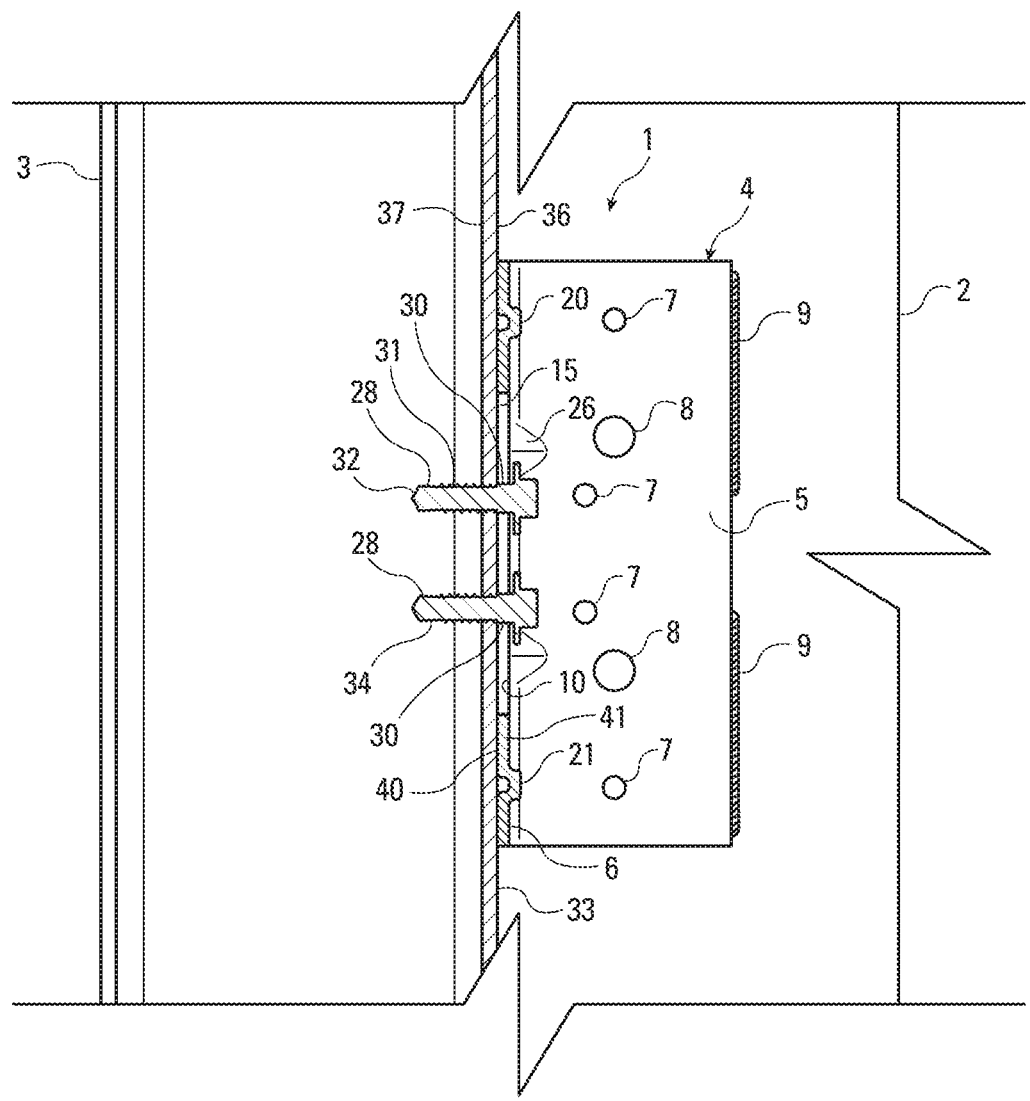
FIG. 15 is a cross-sectional side view of the connection shown in FIG. 12.
Figure 16:
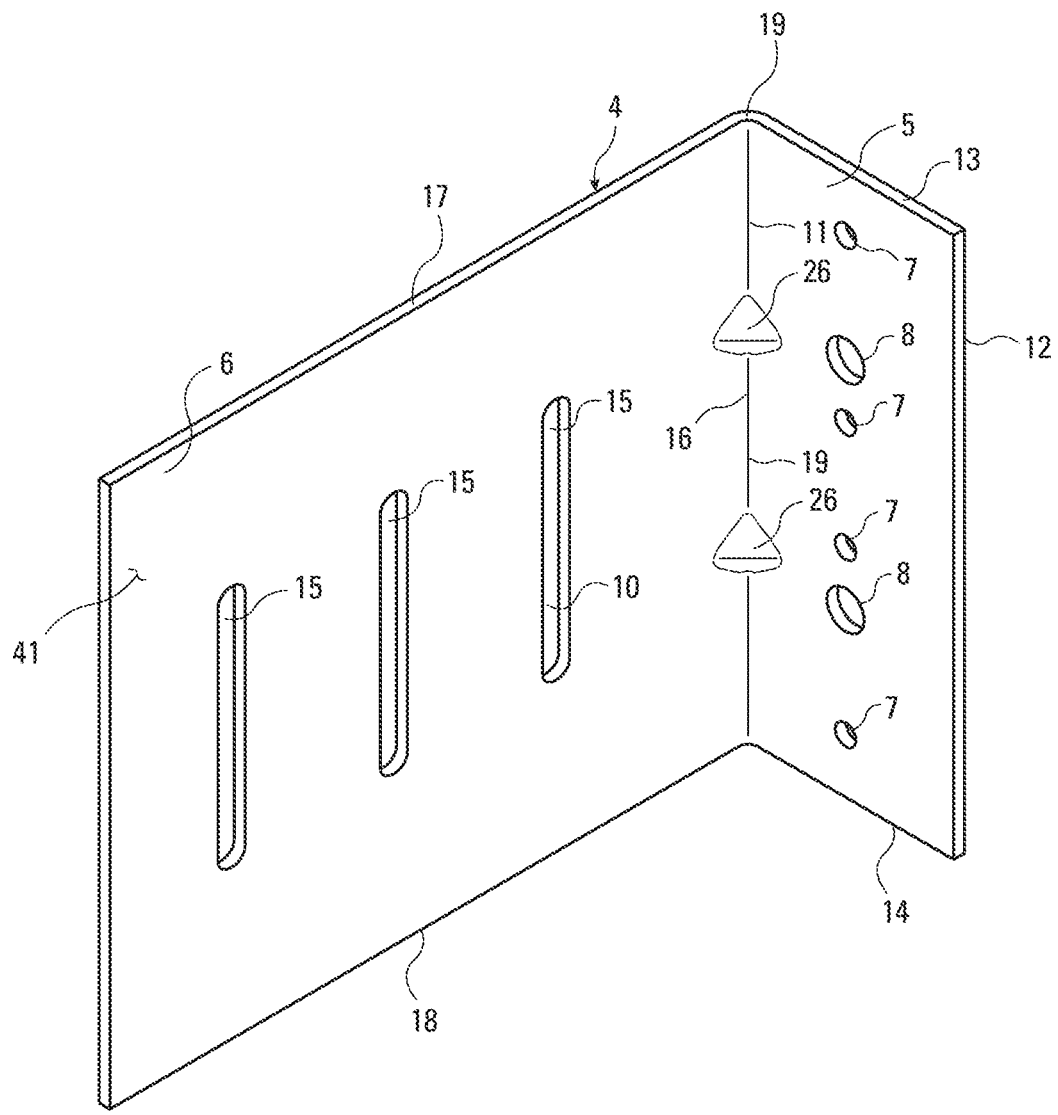
FIG. 16 is a perspective view of one embodiment of the connector of the present invention.
Figure 17:
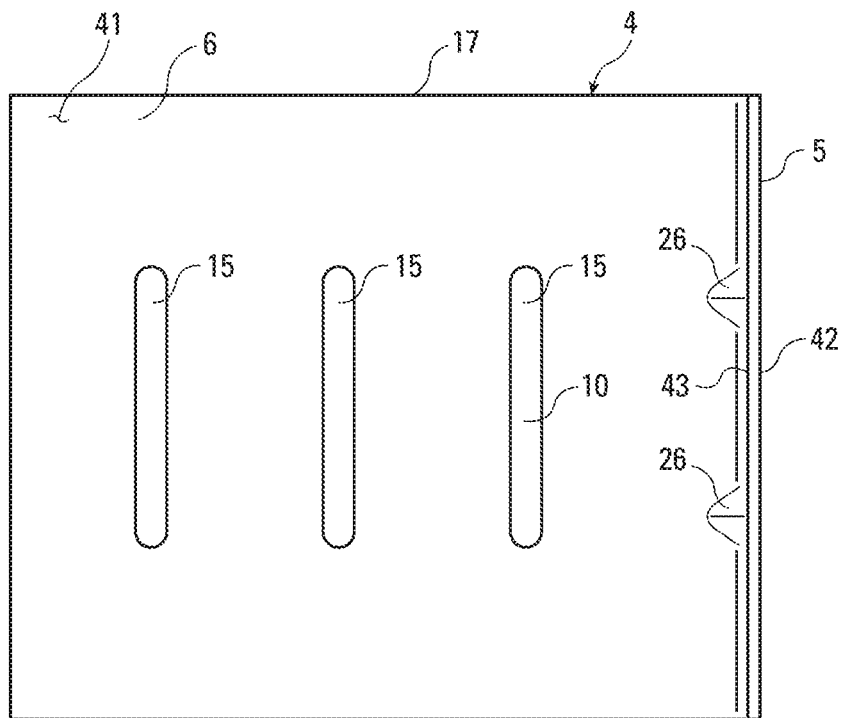
FIG. 17 is a front view of the connector of FIG. 16.
Figure 18:
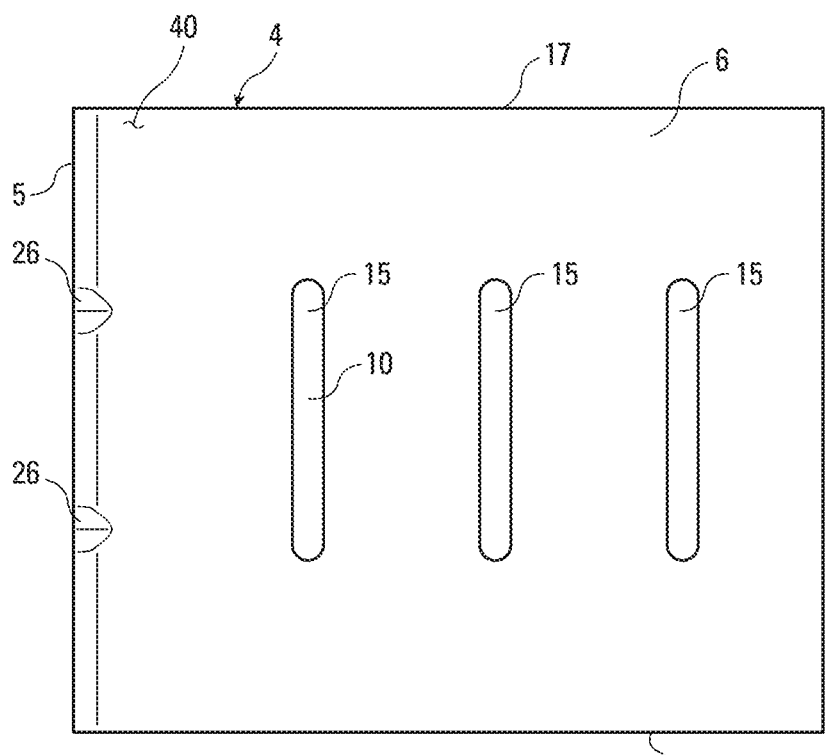
FIG. 18 is a back view of the connector of FIG. 16.
Figure 21:
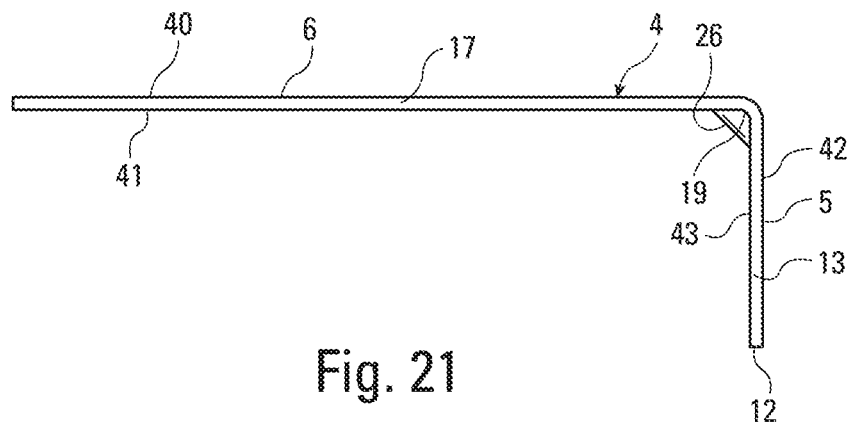
FIG. 21 is a top view of the connector of FIG. 16.
Figure 22:
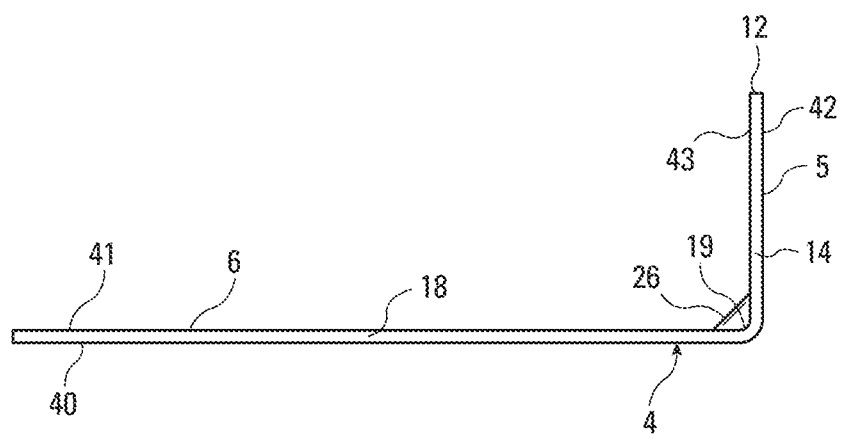
FIG. 22 is a bottom view of the connector of FIG. 16.
Figure 23:
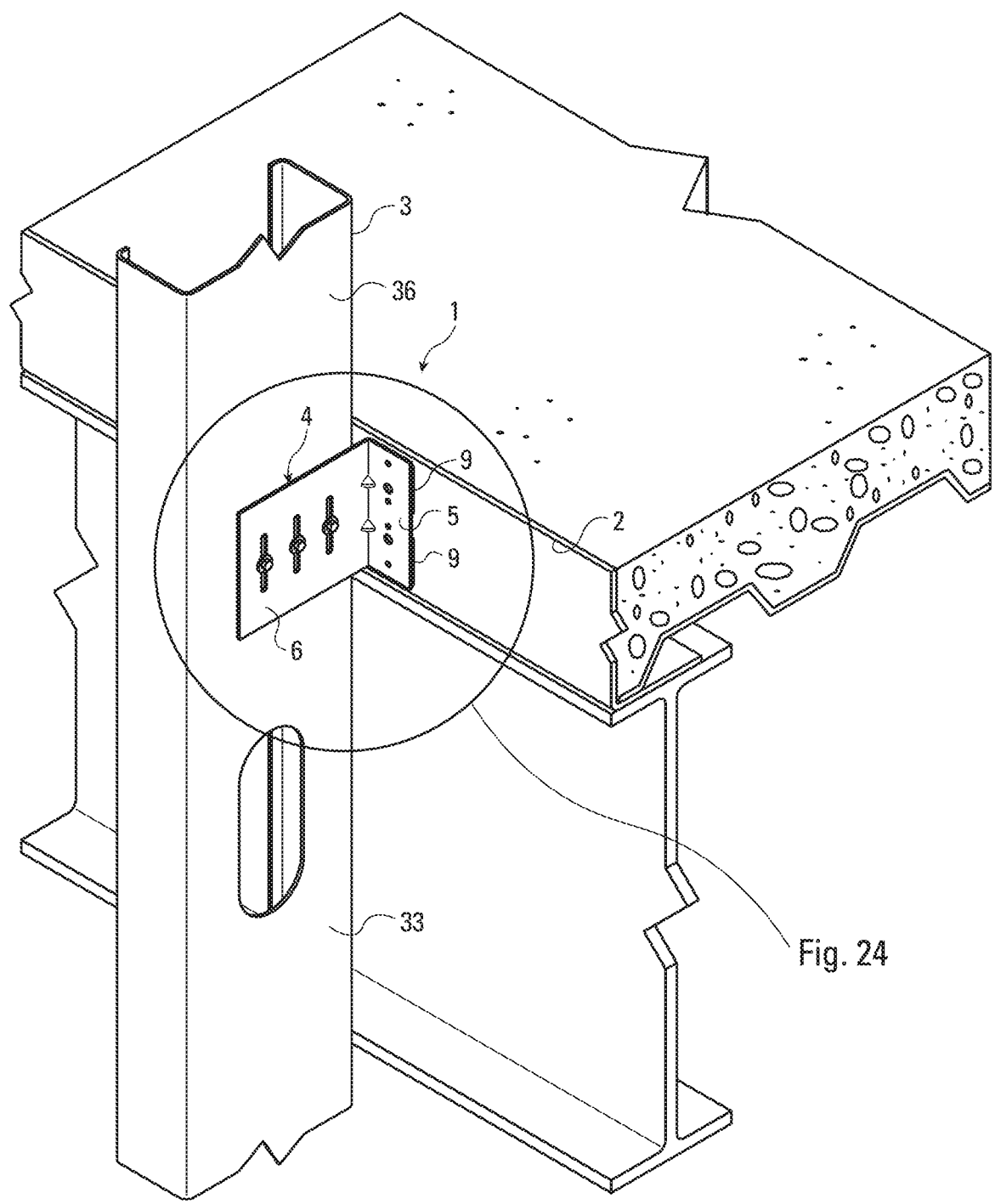
FIG. 23 is a perspective view of a wall stud to floor member connection formed according to the present invention.
Figure 24:
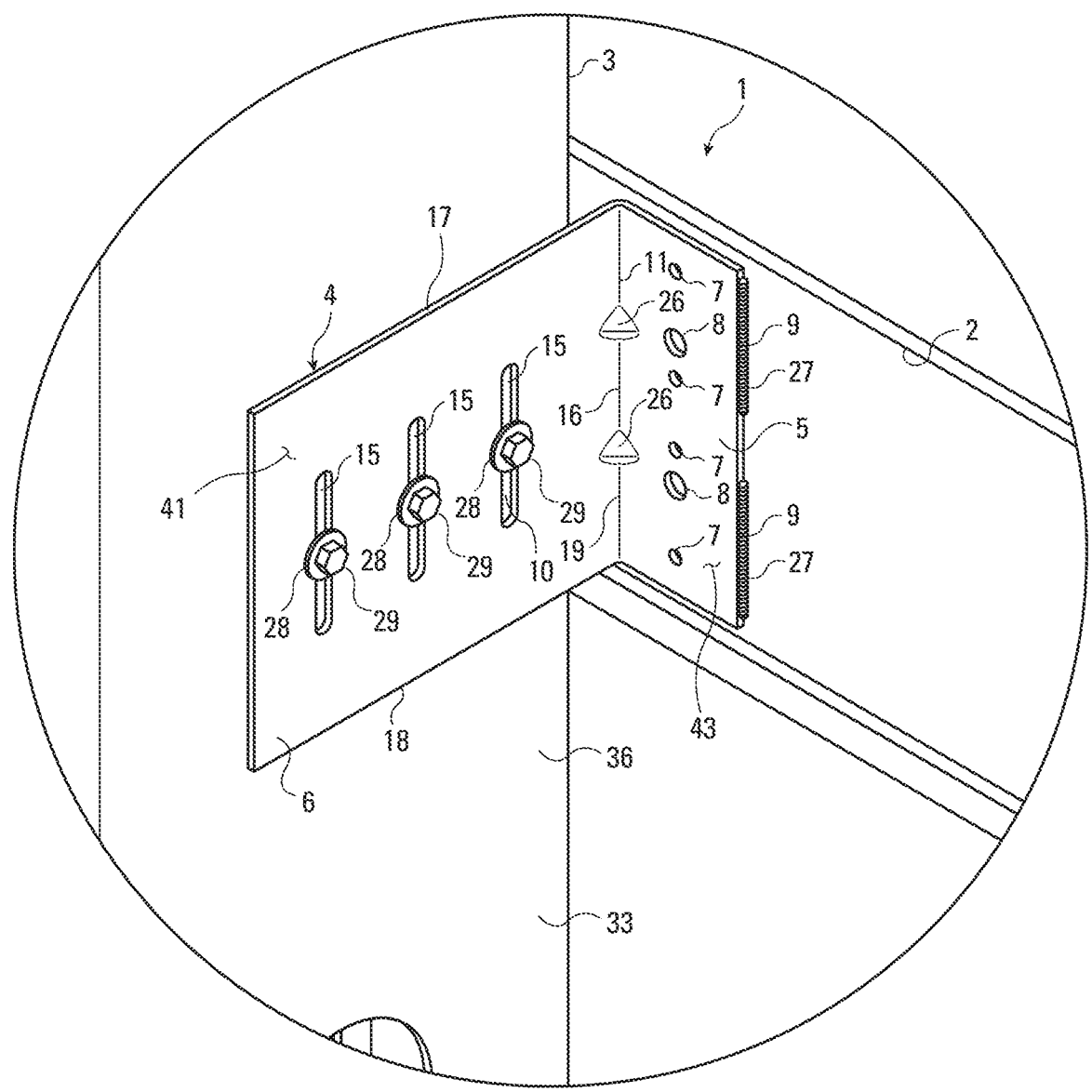
FIG. 24 is a close-up perspective view of the connection of FIG. 23.

The present invention is a building structural connection 1 between a first structural member 2 and a second structural member 3. Preferably, the first structural member 2 is a supporting member 2 and the second structural member 3 is a supported structural member 3. As shown in FIG. 8, the first structural member 2 is a floor member that is horizontally disposed 2 with an attached ledger and the second structural member 3 is a vertically-oriented channel-shaped wall post or stud 3 that is part of a wall.

The connection 1 between the first structural member 2 and the second structural member 3 is made with a first angled connector 4. The first angled connector 4 is preferably L-shaped, with a first plate 5 fastened to the first building structural member 2 and a second plate 6 fastened to the second building structural member 3. Preferably, the first plate 5 and the second plate 6 are generally planar and joined at right angles to each other. The connector 4 allows for relative vertical movement between the first and second building structural members 2 and 3. The connector 4 is preferably made from cold formed sheet steel, bent, cut, embossed and punched on automated manufacturing machinery.

Figure 1:
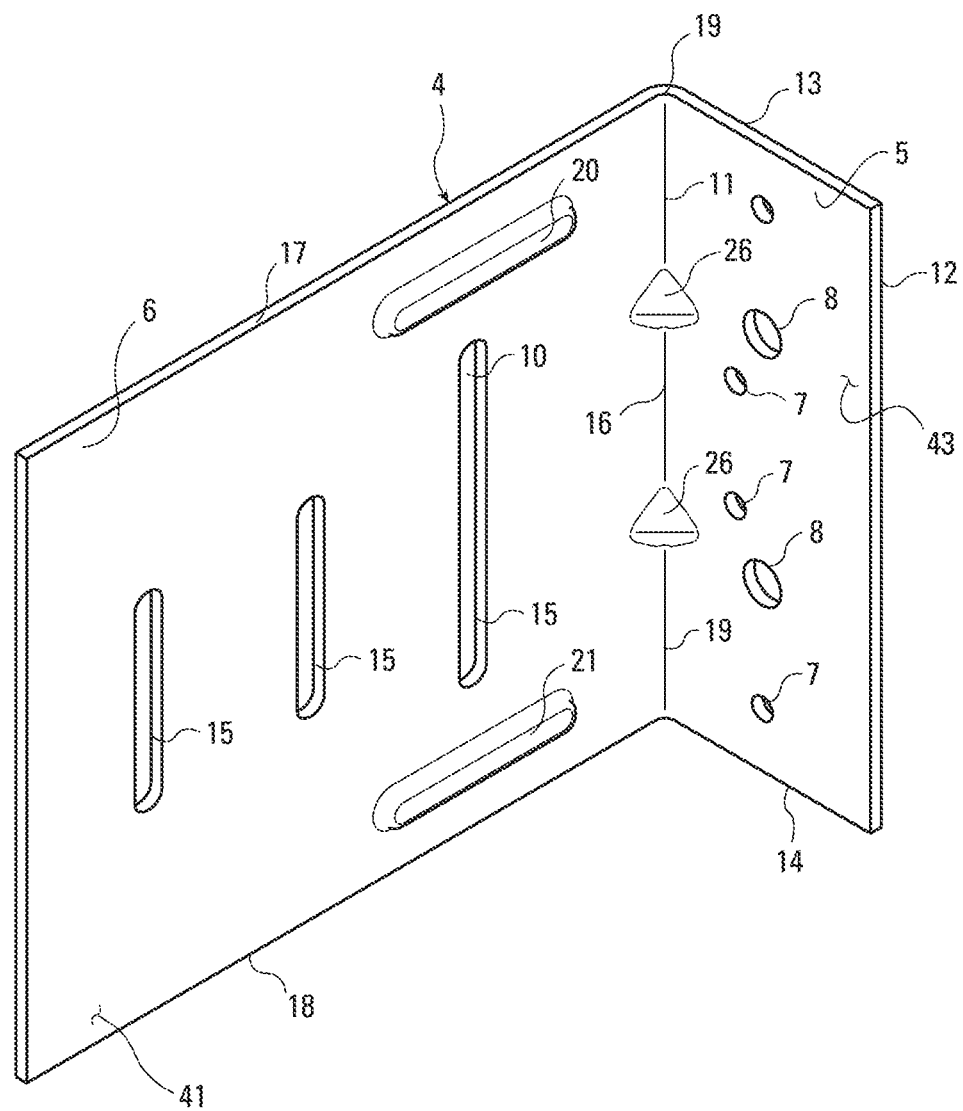
FIG. 1 is a perspective view of one embodiment of the connector of the present invention.
Figure 2:
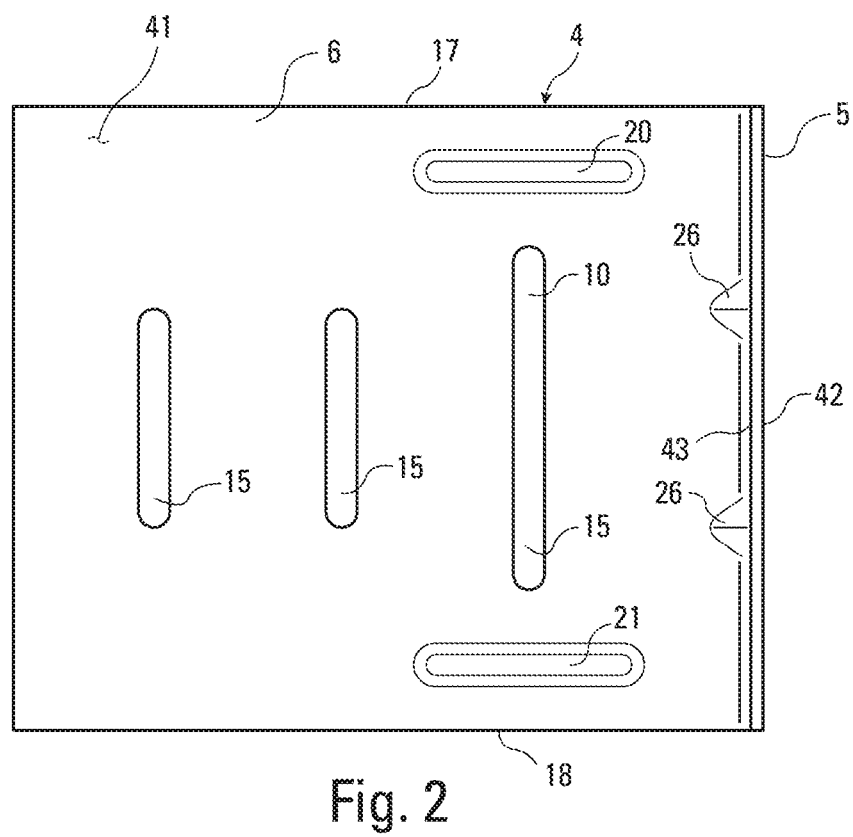
FIG. 2 is a front view of the connector of FIG. 1.

As shown in FIG. 1, the first plate 5 has first and second fastener openings 7 and 8. Fastener openings 8 are larger than fastener openings 7 to accommodate larger fasteners. The angled connector 4 shown in FIG. 8 is attached to the second structural member by welds 9.

The first plate 5 has a first inner edge 11, a first outer edge 12, a first side edge 13 and a second side edge 14.

Figure 3:
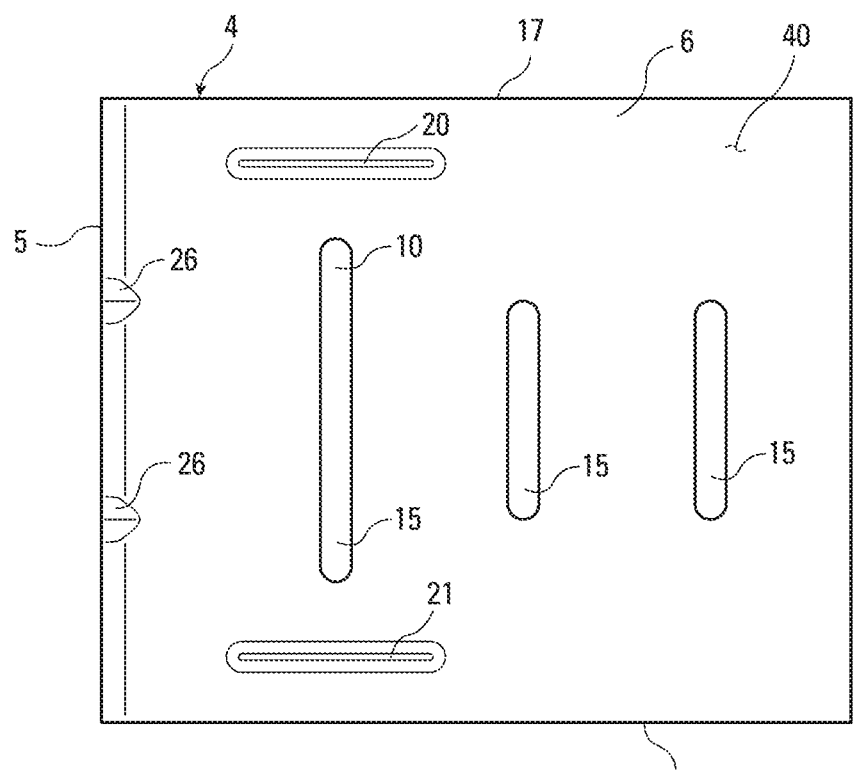
FIG. 3 is a back view of the connector of FIG. 1.
Figure 4:
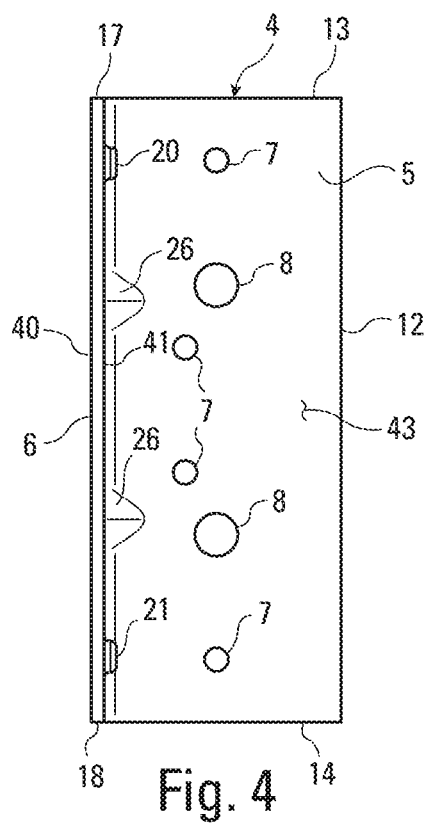
FIG. 4 is left side view of the connector of FIG. 1.
Figure 5:
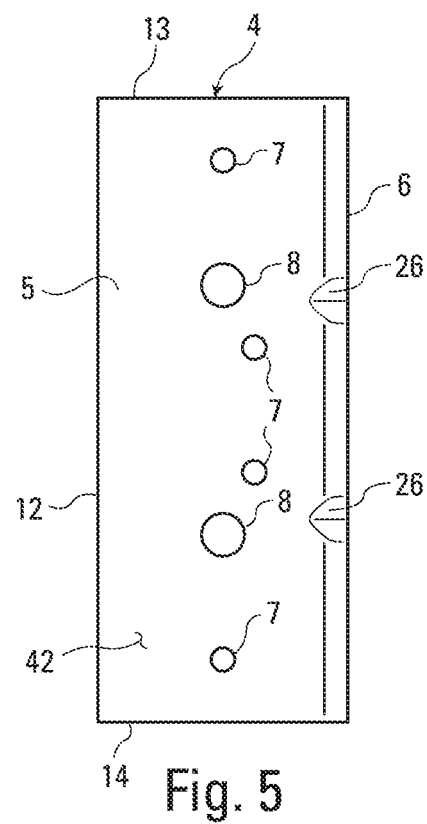
FIG. 5 is a right side view of the connector of FIG. 1.
Figure 6:
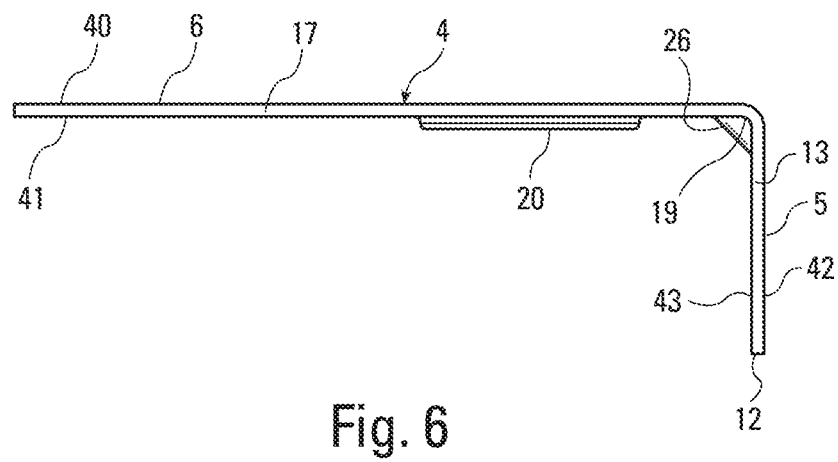
FIG. 6 is a top view of the connector of FIG. 1.
Figure 7:
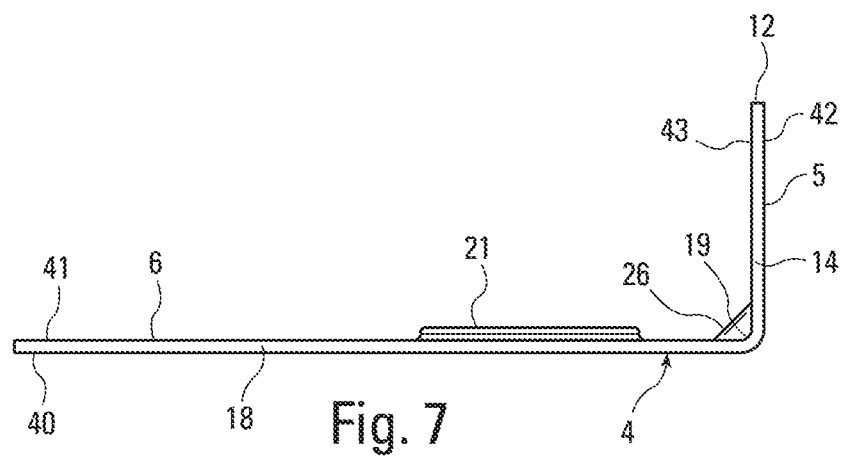
FIG. 7 is a bottom view of the connector of FIG. 1.

As shown in FIG. 3A, the second plate 6 has a plurality of fastener openings 15 formed as elongated slots. The second plate 6 is also provided with a first inner edge 16, a first side edge 17 and a second side edge 18. The first inner edge 11 of the first plate 5 is joined to the first inner edge 16 of the second plate 6 to form an inner angular juncture 19. Preferably the inner angular juncture 19 is 90 degrees. One of the slotted openings 10 lies closer to the juncture 19 than the other slotted openings. The slotted openings 15 are preferably disposed parallel to the angular juncture 19 between the first plate 5 and the second plate 6. Each elongated slot 15 in the second plate 6 is a site of a fastening to the second structural member 3.

As shown in FIG. 1, a first reinforcing deformation or embossment 20 is provided parallel to the first side edge 17 of the second plate 6. A second reinforcing deformation or embossment 21 is provided parallel to the second side edge 18 of the second plate 6. The first and second reinforcing embossments 20 and 21 preferably extend orthogonally to the elongated slotted openings 15 in the second plate 6. Preferably, they are disposed adjacent and to either side of the nearest slotted opening 10 to the angular juncture 19. Preferably, the emobssments 20 and 21 extend past the lateral sides of the elongated opening 10 and are disposed away from the side edges 17 and 18.

As shown in FIG. 1, the connector 4 includes a plurality of gusset darts 26 having a substantially triangular shape when viewed from a lateral side thereof, the substantially triangular shaped gusset darts 26 are disposed in the inner angular juncture 19 between the plates 5 and 6. The gusset darts 26 preferably have a substantially u-shaped cross-section. The gusset darts 26 reinforce the inner angular juncture 19.

Preferably, a first plurality of fasteners 27 attaches the first plate 5 to the first building structural member 2. As shown in the drawings the fastenes 27 can be welds, but anchors and screws received in the fastener openings 7 and 8 are also preferred. A plurality of fasteners 28 preferably attaches the second plate 6 to the second building structural member 3. Preferably, the fasteners 28 that attach the second plate to the second structural member are screws 28 of similar dimensions. The preferred fasteners 27 for attaching the connector 4 to first structural member 2 made from steel are hex-head fasteners 27, automated power-actuated gun-driven fasteners 27 or, alternatively, welds 27. The preferred fasteners 27 for attaching the connector 4 to first structural members 2 made from concrete are concrete screws 27. The preferred fasteners 28 for attaching the connector 4 through slots 15 are shouldered, or stepped-shank, self-drilling screws 28.

As shown in FIG. 1A, the second plurality of fastener openings 15 is preferably formed as a plurality of elongated slots 15 in the second plate 6 as movement between the structural member 3 and the connector 4 is desired. When the fastener 28 is drilled into or connected to the stud or second structural member 3, the fastener is anchored in the stud 3. When the stud 3 moves relative to the first structural member 2, the fastener 28 moves in the elongated slots 15. Preferably, the first building structural member 2 is fastened to the first connector 4 so that the first building structural member 2 cannot move relative the first plate 5 of the first connector 4. The second building structural member 3 is preferably fastened to the first connector 4 so that the second building structural member 3 can move relative to the second plate 6 of the first connector 4. The plurality of elongated slot openings 15 that extend across the second plate 6 extend generally parallel to the inner angular juncture 19 between the first plate 5 and the second plate 6.

Preferably, the fasteners of the second plurality of fasteners 28 are shouldered, or stepped-shank screws 28. Shouldered screws 28 have a head 29, an unthreaded shank portion 30 immediately below the head 29, a threaded shank portion 31 below the unthreaded shank portion 30, and a tip 32. The tip is preferably a self-drilling tip. The unthreaded shank portion 30 allows the second building structural member 3 and the fasteners 28 attached to it to move relative to the second plate 6 without interference between the second plurality of fastener 28 and the second plate 6 of the first connector 4. The tip 32 is designed to drill itself into the web 33 of the stud 3. The web 33 of the stud is preferably a substantially planar member.

Each elongated slot 15 in said second plate 6 is a site of a fastening to the second structural member 3, and each elongated slot 15 receives at least one fastener 28 having an elongated shank and a head 29, wherein the elongated shank of each fastener 28 is received in the second structural member 3, and each at least one fastener 28 can move along the elongated slot 15 in the second plate 6 when the second structural member 3 moves with respect to the second plate 6, and wherein an additional fastener anchoring member 34 is provided to the fastening in the elongated slot 10 closest to the angular juncture 19.

As shown in FIGS. 8-15, the additional fastener anchoring member 34 is one or more additional fasteners 28 placed in the elongated slot 10 and received by the second structural member 6. As shown in FIGS. 1-15, the elongated slot 10 closest to the angular juncture 19 can made longer than the other elongated slots 15 to allow more fasteners 28 to be placed in the slot while still allowing for the same amount of movement between the second structural member 3 and the angular connector 4.

Figure 25:
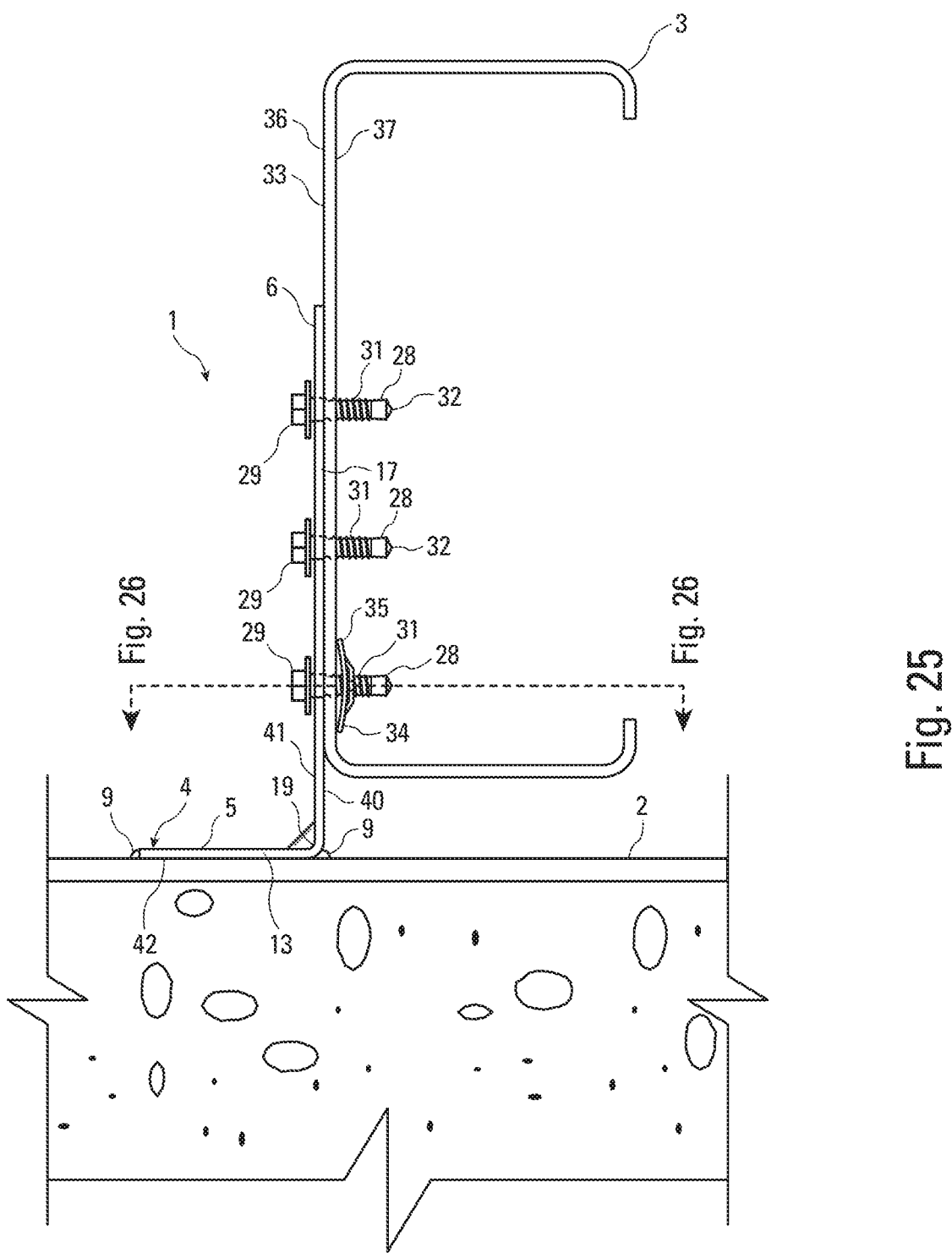
FIG. 25 is a top view of the connection shown in FIG. 23.
Figure 26:
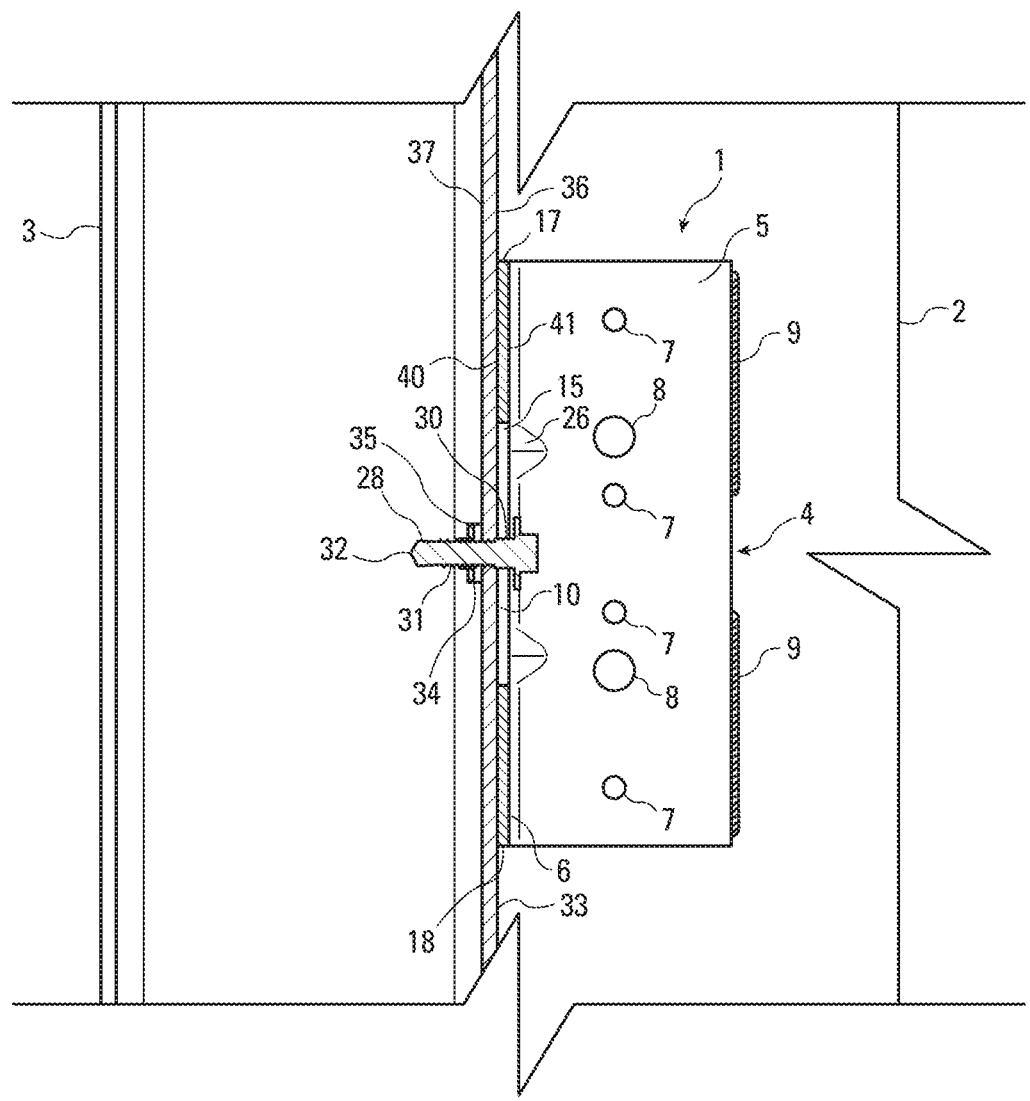
FIG. 26 is a cross-sectional side view of the connection shown in FIG. 23.

The additional fastener anchoring member 34 can also be a stop attached to or working in conjunction with the fastener 28 that will resist the fastener 28 being pulled through the second structural member 3. As shown in FIG. 25, the additional fastener anchoring member 34 is a clip 35 attached to the elongated shank of the fastener 28. The second structural member 3 preferably has an attachment face 36 and an opposite face 37. The angular connector 4 is preferably disposed on the attachment face 36 as shown in FIG. 25. The clip 35 is provided on the elongated shank of the fastener on the portion emerging from the opposite face 37 of the second structural member 3. Preferably, as shown in FIG. 25 the clip 35 presses against the opposite face 37 of the second structural member 3. The clip engages the thread of the elongated fastener 28 and resists the fastener 28 being pulled from the second structural member 3 when the second plate 6 may try to separate from the second structural member 3 under certain load conditions.

Figure 27:
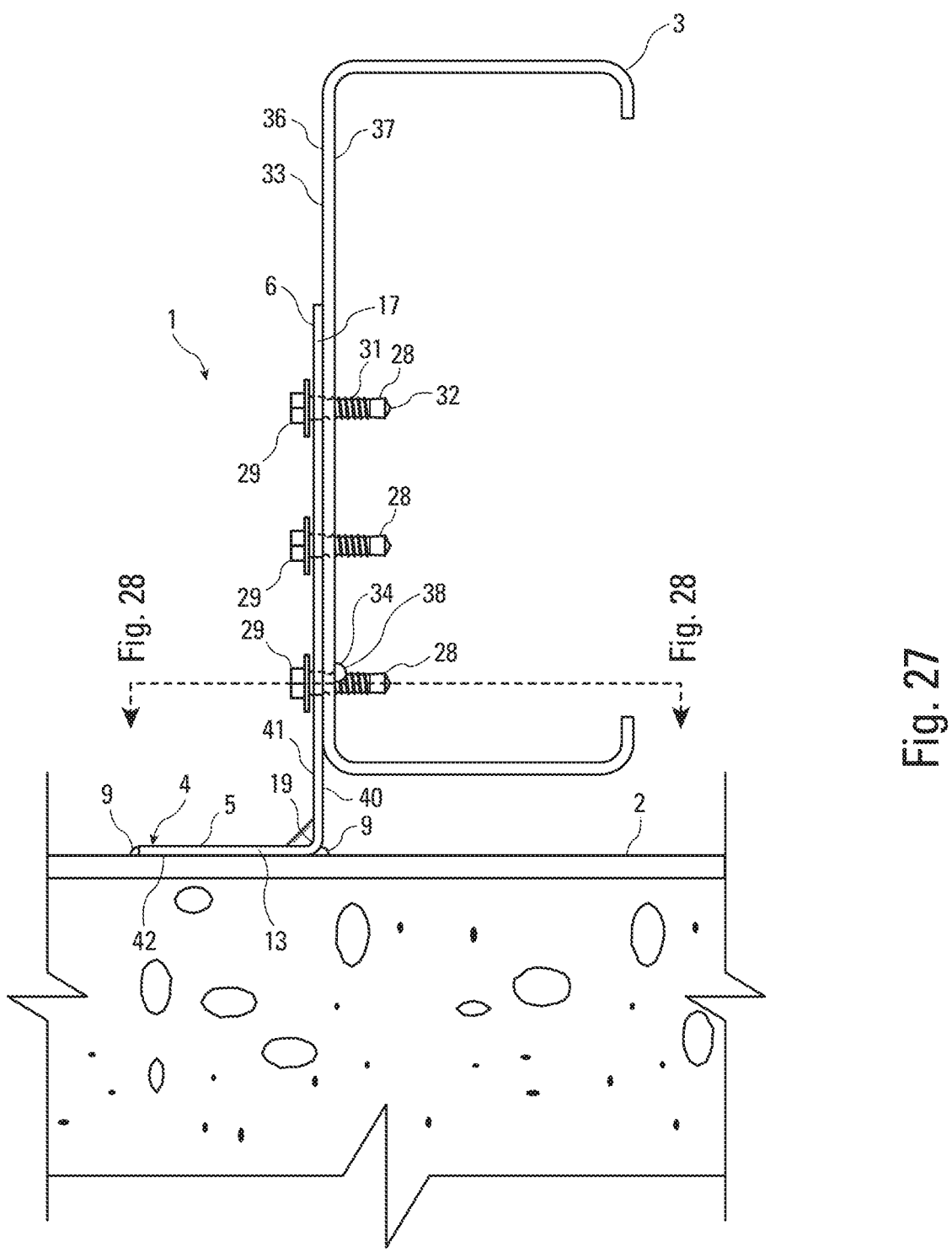
FIG. 27 is a top view of a connection formed according to the present invention, showing a weld applied to one of the fasteners.
Figure 28:
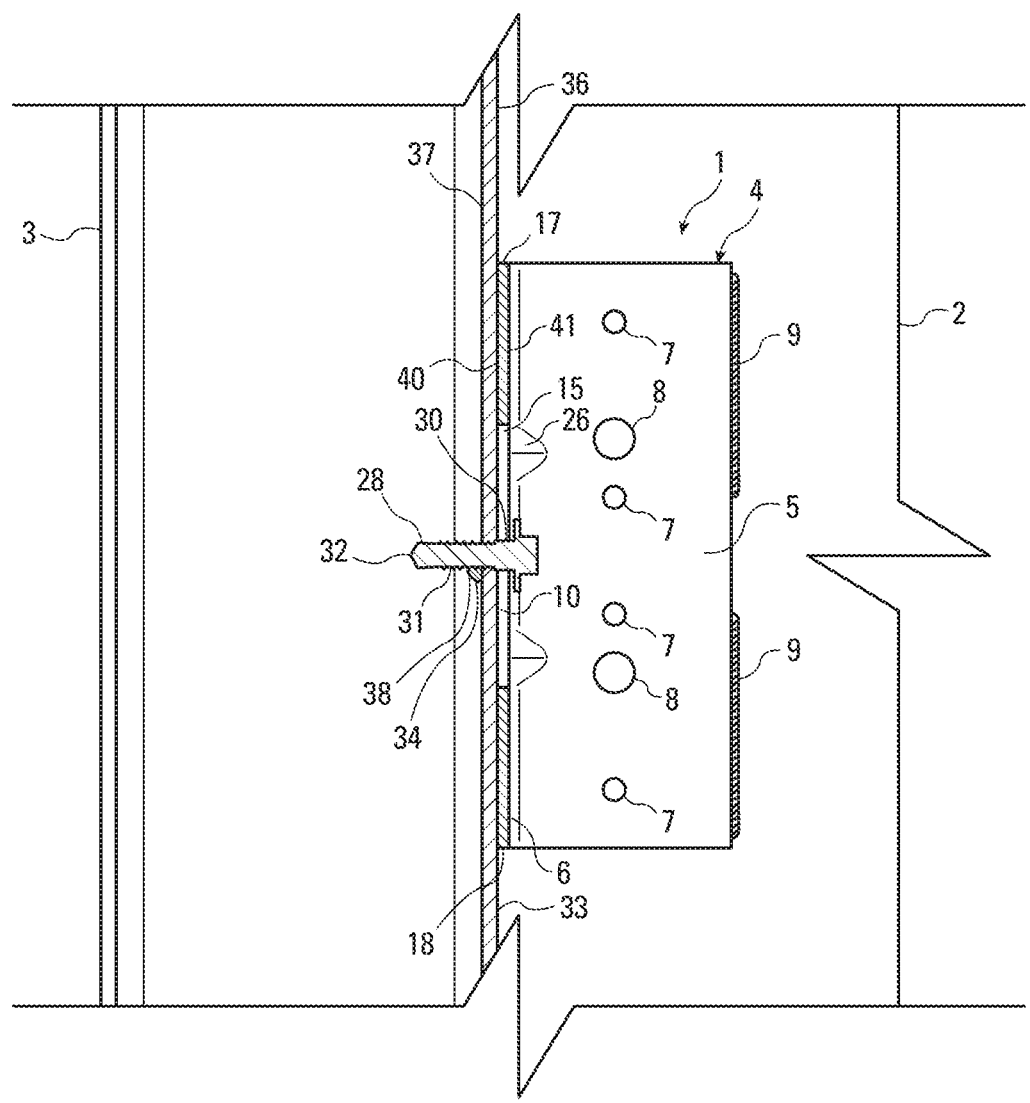
FIG. 28 is a cross-sectional side view of the connection shown in FIG. 27.

As shown in FIG. 25, the additional fastener anchoring member 34 is a weld 38 attached to the elongated shank of the fastener 28. The angular connector 4 is preferably disposed on the attachment face 36 as shown in FIG. 27. The weld 38 is provided on the elongated shank of the fastener on the portion emerging from the opposite face 37 of the second structural member 3. Preferably, as shown in FIG. 27 the weld 38 is also applied to the opposite face 37 of the second structural member 3.

Figure 29:
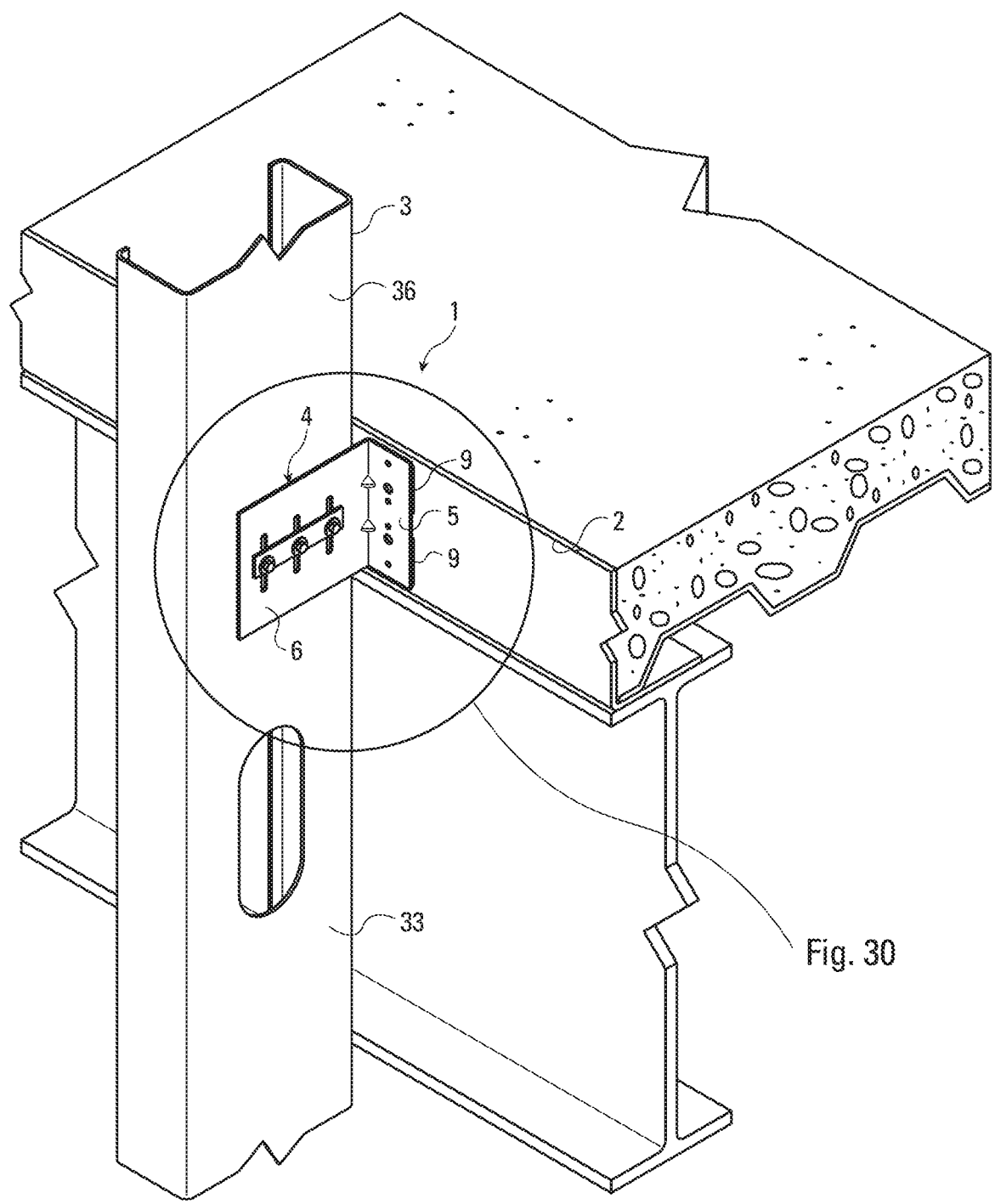
FIG. 29 is a perspective view of a wall stud to floor member connection formed according to the present invention.
Figure 30:
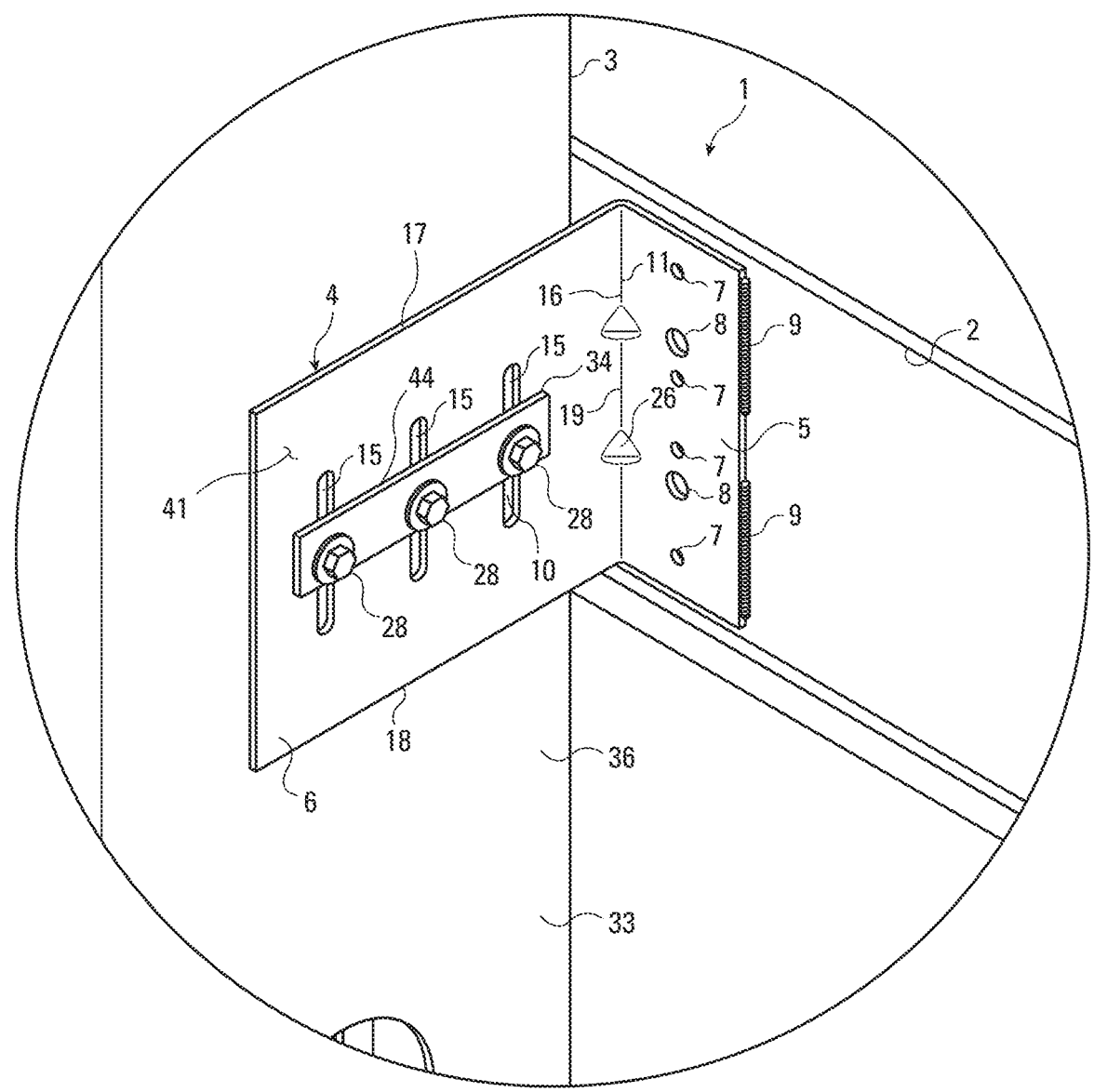
FIG. 30 is a close-up perspective view of the connection of FIG. 29.
Figure 31:
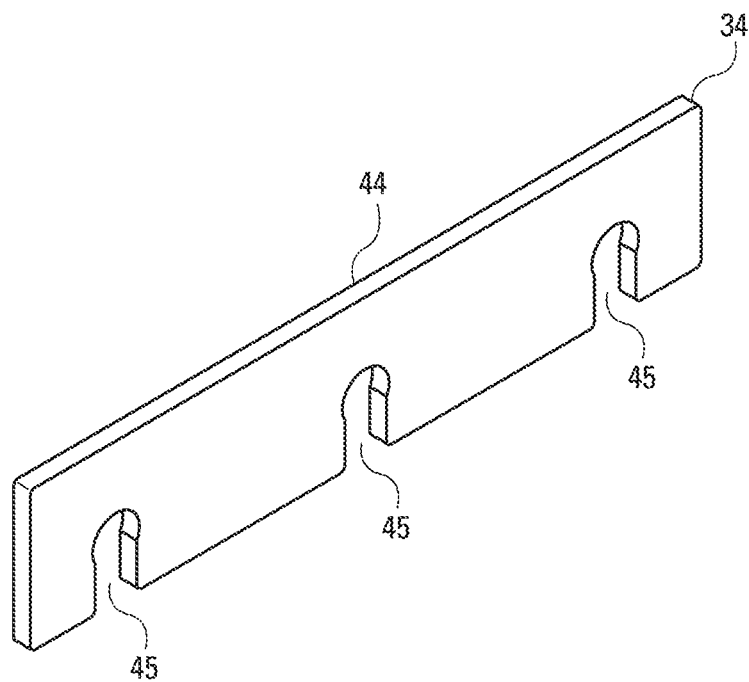
FIG. 31 is a perspective view of the washer used in the connection of FIG. 29.
Figure 32:
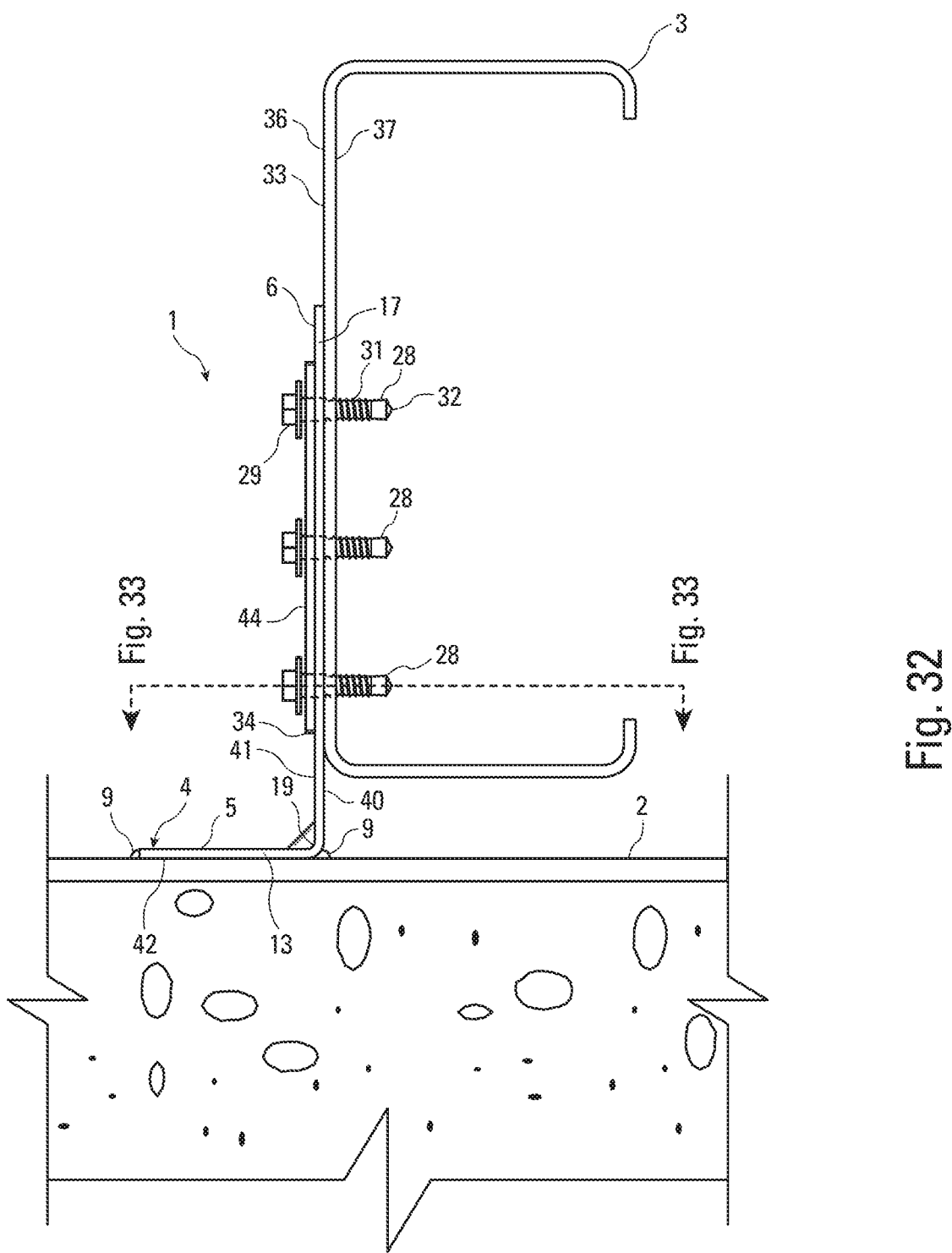
FIG. 32 is a top view of the connection shown in FIG. 29.
Figure 33:
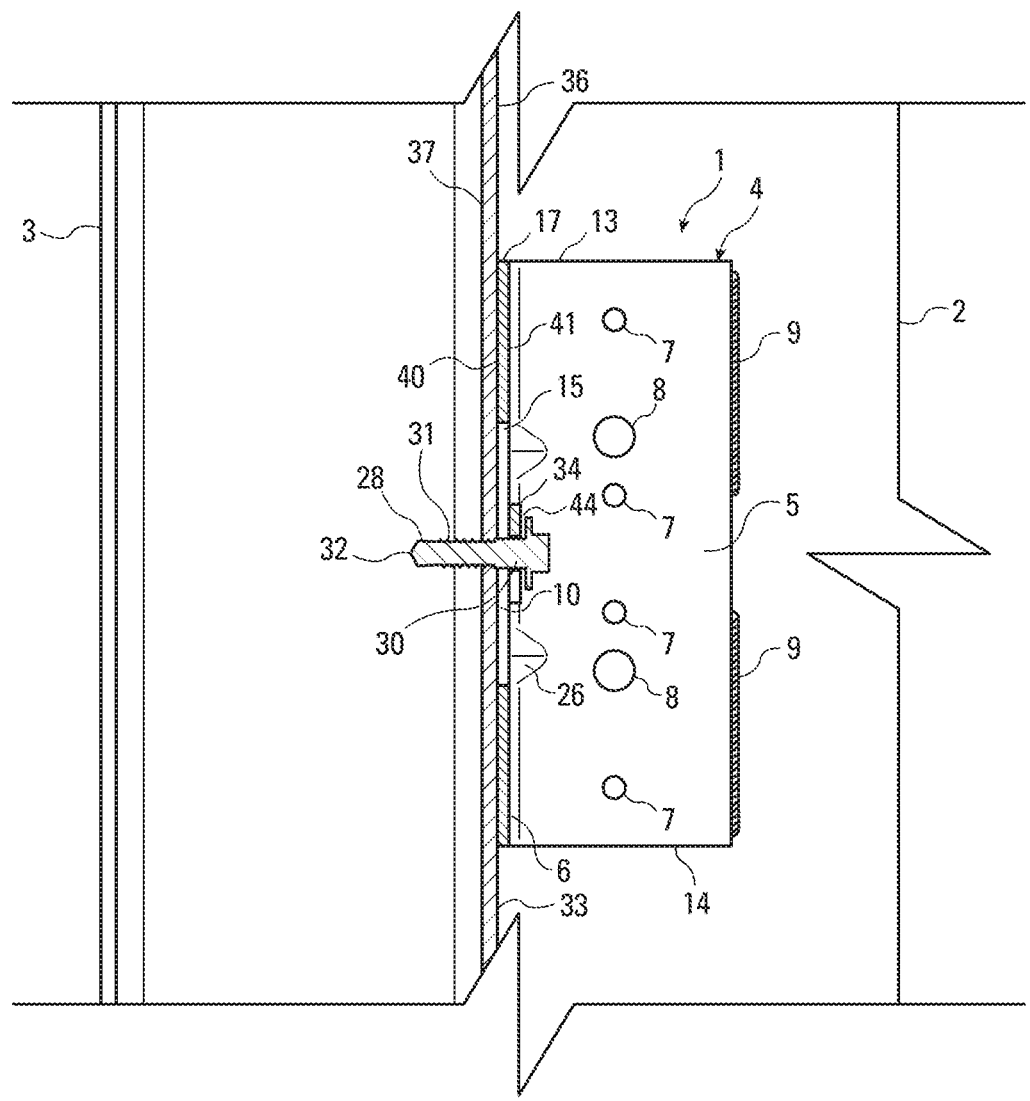
FIG. 33 is a cross-sectional side view of the connection shown in FIG. 29.

The second plate 6 has an attachment side 40 and an open side 41 facing in the opposite direction. The attachment side 40 of the second plate 6 faces the second building structural member 3. Similarly, the first plate 5 has an attachment side 42 and an open side 43 facing in the opposite direction. The attachment side 42 of the first plate 5 faces the first building structural member 2. As shown in FIG. 29, the additional fastener anchoring member 34 is an elongated washer 44 attached to the elongated shank of the fastener 28. The washer 44 has a substantially planar member disposed between the head 29 of the fastener 28 and the opposite or open side 41 of the second plate 6. Preferably, the washer 44 receives a second fastener 28 that attaches the angular connector 4 to the second structural member 3 and is received in a different elongated slot 15. Preferably the washer receives all of the fasteners 28. Preferably, the washer 44 is made with notches 45 for ease of installation where the fasteners 28 are received by the washer 44.

Figure 34:
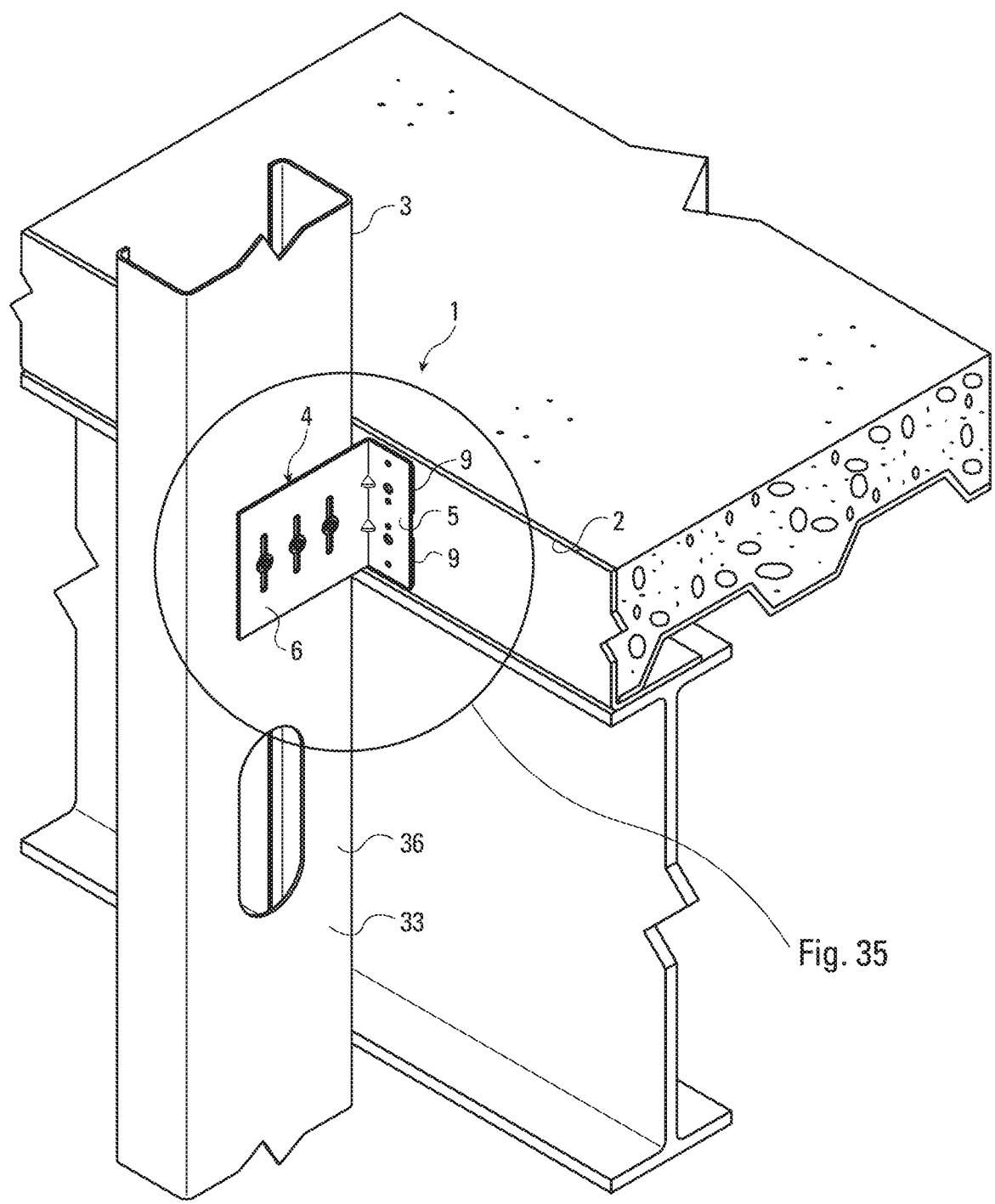
FIG. 34 is a perspective view of a wall stud to floor member connection formed according to the present invention.
Figure 35:
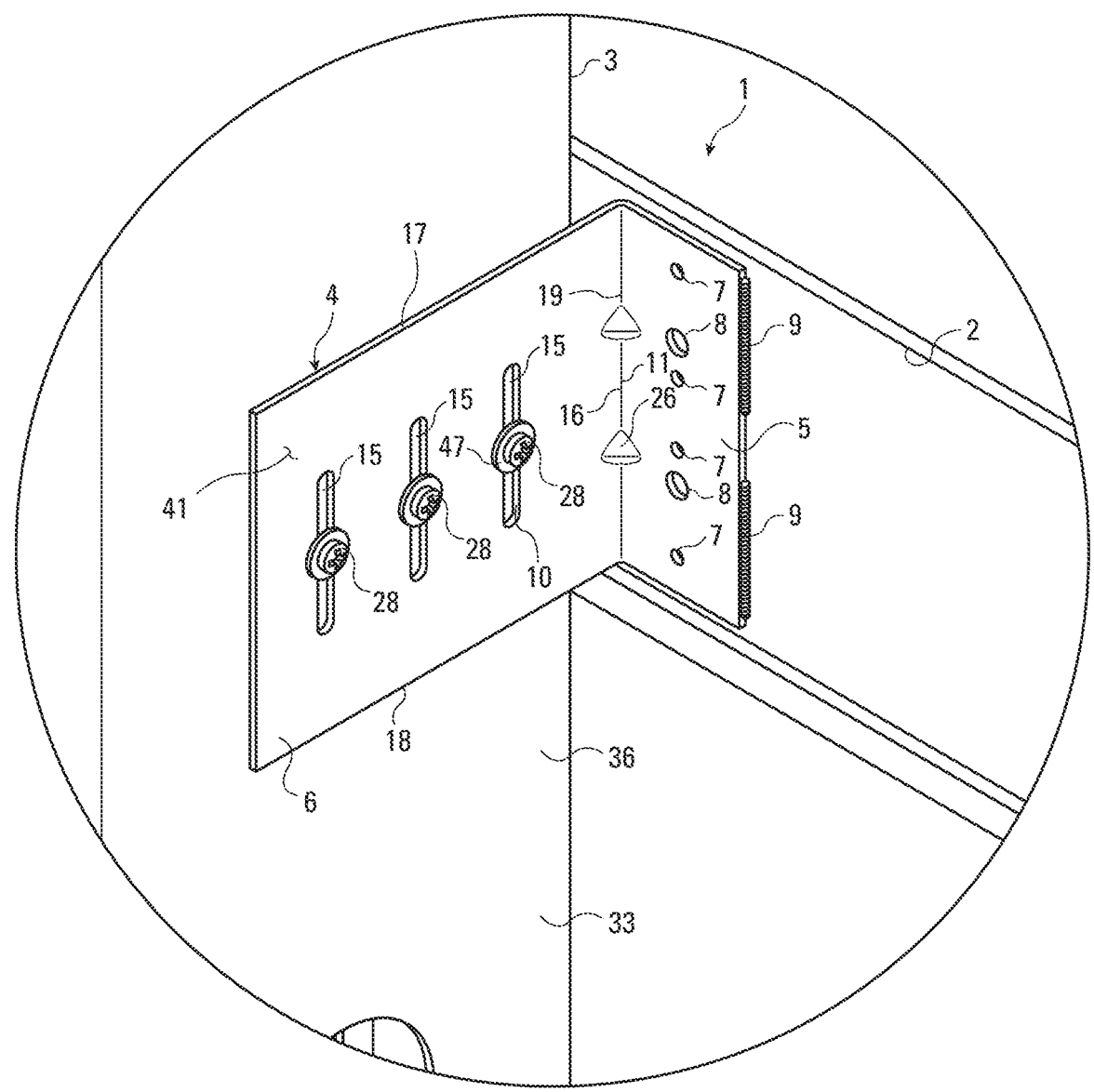
FIG. 35 is a close-up perspective view of the connection of FIG. 34.
Figure 36:
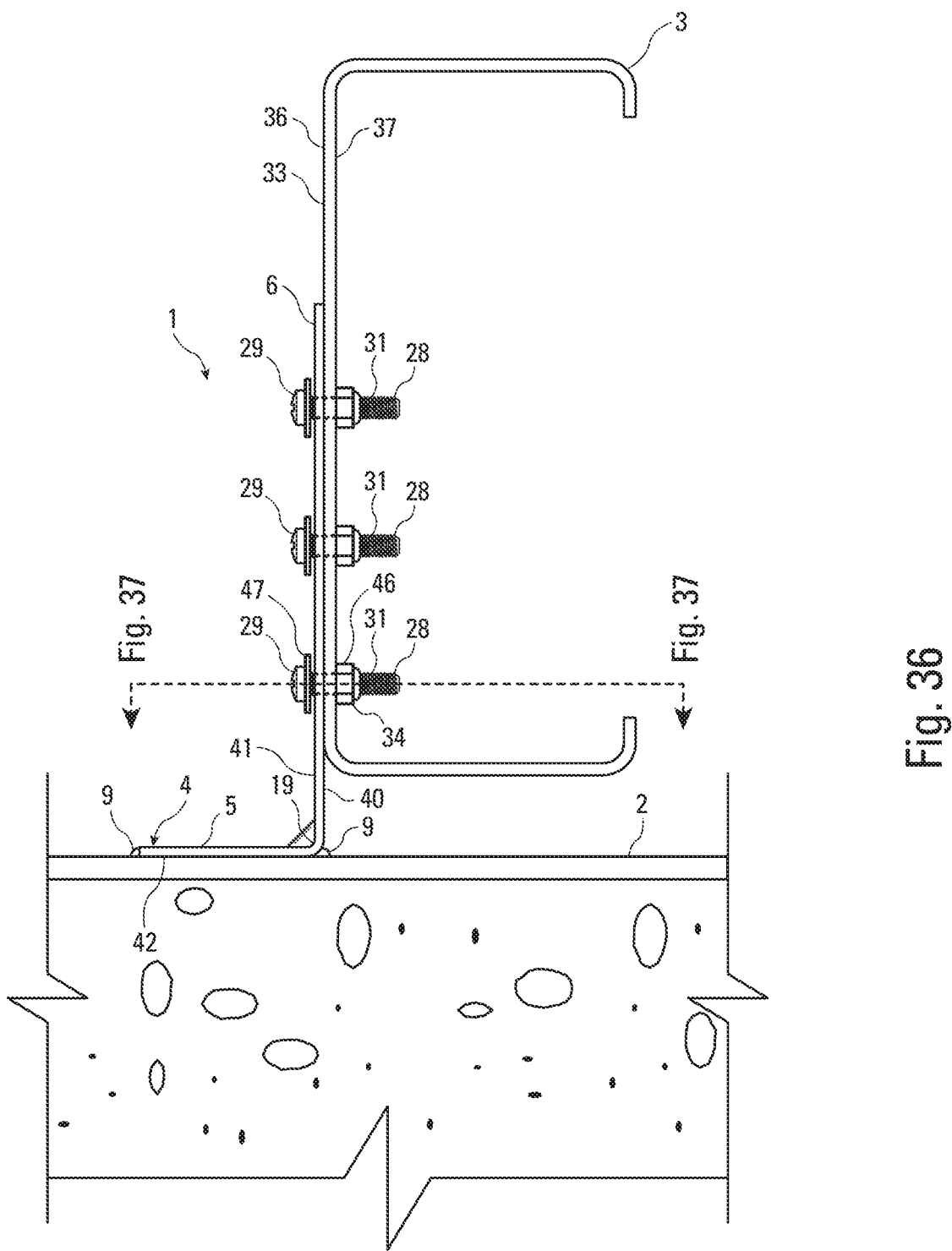
FIG. 36 is a top view of the connection shown in FIG. 34.
Figure 37:
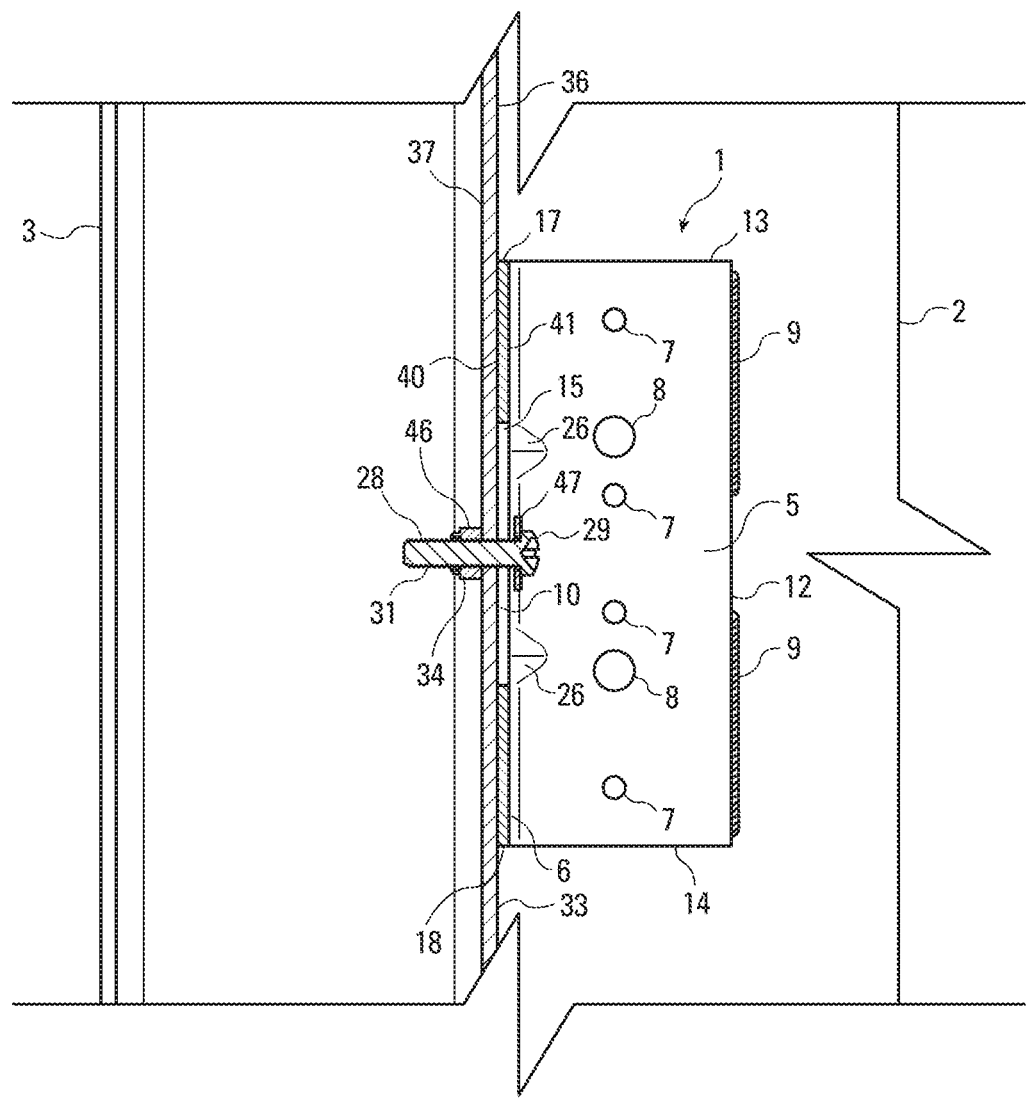
FIG. 37 is a cross-sectional side view of the connection shown in FIG. 34.

As shown in FIGS. 34-36, the additional fastener anchoring member 34 is a nut 46 attached to the elongated shank of the fastener 28. The nut 46 is provided on the elongated shank of the fastener 28 on the portion emerging from the opposite face 37 of the second structural member 3. Preferably, as shown in FIG. 25 the nut 46 presses against the opposite face 37 of the second structural member 3. As shown in FIGS. 34-36 the fasteners 28 are machine screws that are designed to receive nut 46. The machine screws 28 shown do not have a unthreaded shank portion. In such instances, it is preferred to use a lock nut which will resist unintended movement on the elongated shank of the fastener 28. In this way the distance between the nut 46 and the head 29 of the fastener can be set by the installer to allow for a looseness in the connection. In this way, the head 29 of the fastener 28 will not bear too much on the second plate of the connector 4 and prevent ease of movement between the stud 3 and the angular connector 4. A separate washer 47 is used with the machine screws shown in FIGS. 34-37. As shown in FIG. 37, the lock nut is formed with an internal washer that resists unintended movement of the nut 46 along the elongated shank of the fastener 28.

I claim:

1. A building structural connection comprising:
   a. a first structural member;
   b. a second structural member;
   c. a first connector connecting said first structural member to said second structural member, said first connector having a first plate fastened to said first structural member, and a second plate fastened to said second structural member, said second plate being joined to said first plate at an angular juncture, wherein said second plate has a plurality of fastener openings, said plurality of fastener openings are a plurality of substantially parallel elongated slots in said second plate, said plurality of elongated slots being disposed substantially parallel to the angular juncture between the first and second plates, and a single one of the elongated slots is disposed closer to the angular juncture than a remainder of said plurality of elongated slots, the single one elongated slot having a length and the remainder of said plurality of elongated slots having respective lengths, and at least two of the plurality of elongated slots in said second plate is a site of a fastening to the second structural member, and said at least two of the plurality of elongated slots receives at least one fastener having an elongated shank and a head, wherein the elongated shank of each said fastener is received in the second structural member, and each said at least one fastener moves along the elongated slot in the second plate when the second structural member moves with respect to the second plate, and wherein the single one elongated slot disposed closer to the angular juncture than the remainder of said plurality of elongated slots is one of the sites of the fastening to the second structural member and receives said at least one fastener having said elongated shank and said head, and an additional fastener anchoring member is provided to the fastening in the single one elongated slot closest to the angular juncture; wherein
   d. the length of elongated slot in the second plate closest to the angular junsture is longer than the respective length of the elongated slot in the second plate farthest from the angular juncture.

2. The building structural connection of claim 1, wherein: each said length is different.

3. The building structural connection of claim 1, wherein:
a. the second structural member has an attachment face and an opposite face, and the first connector is disposed on the attachment face; and
b. the additional fastener anchoring member is a clip provided on the elongated shank of the fastener on a portion of the fastener emerging from the opposite face of the second structural member.

4. The building structural connection of claim 1 further comprising:
one or more gusset darts in the angular juncture that reinforce the angular juncture.

5. The building structural connection of claim 1 wherein:
said first structural member is fastened to said first connector so that said first building structural member is fixed relative said first plate of said first connector.

6. The building structural connection of claim 1, wherein:
each of the plurality of elongated slots in the second plate is the site of the fastening to the second structural member.

7. The building structural connection of claim 1, wherein:
a. said first structural member is horizontally disposed member, and
b. said second structural member is a vertically disposed member that is part of a wall.

8. The building structural connection of claim 1, wherein:
a. the elongated slots in the second plate are of equal width; and
b. the fasteners received in the second structural member are of similar dimensions.

9. The building structural connection of claim 1, wherein:
the additional fastener anchoring member is one or more additional fasteners placed in the elongated slot that is closest to the angular juncture, and the one or more additional fasteners are also received by the second structural member.

10. The building structural connection of claim 1, wherein:
a. the second structural member has an attachment face and an opposite face, and the first connector is disposed on the attachment face; and
b. the additional fastener anchoring member is a weld provided on the elongated shank of the fastener on a portion of the fastener emerging from the opposite face of the second structural member.

11. The building structural connection of claim 10, wherein:
the weld provided on the elongated shank of the fastener is also provided on the second structural member.

12. The building structural connection of claim 1, wherein:
a. the second structural member has an attachment face and an opposite face, and the first connector is disposed on the attachment face; and
b. the additional fastener anchoring member is a stop provided on the elongated shank of the fastener on a portion of the fastener emerging from the opposite face of the second structural member.

13. The building structural connection of claim 12, wherein:
the stop is a nut engaging threads on the elongated shank of the fastener.

14. The building structural connection of claim 1 wherein:
said fasteners that attach said second plate to said second structural member are screws.

15. The building structural connection of claim 14 wherein:
said fasteners that attach said second plate to said second structural member are shouldered screws.

16. A building structural connection comprising:
a. a first structural member;
b. a second structural member;
c. a first connector connecting said first structural member to said second structural member, said first connector having a first plate fastened to said first structural member, and a second plate fastened to said second structural member, said second plate being joined to said first plate at an angular juncture, wherein said second plate has a plurality of fastener openings, said plurality of fastener openings are a plurality of substantially parallel elongated slots in said second plate, said plurality of elongated slots being disposed substantially parallel to the angular juncture between the first and second plates, and a single one of the elongated slots is disposed closer to the angular juncture than a remainder of said plurality of elongated slots, the single one elongated slot having a length and the remainder of said plurality of elongated slots having respective lengths, wherein each said length is different, and at least two of the plurality of elongated slots in said second plate is a site of a fastening to the second structural member, and said at least two of the plurality of elongated slots receives at least one fastener having an elongated shank and a head, wherein the elongated shank of each said fastener is received in the second structural member, and each said at least one fastener moves along the elongated slot in the second plate when the second structural member moves with respect to the second plate, and wherein the single one elongated slot disposed closer to the angular juncture than the remainder of said plurality of elongated slots is one of the sites of the fastening to the second structural member and receives said at least one fastener having said elongated shank and said head, and an additional fastener anchoring member is provided to the fastening in the single one elongated slot closest to the angular juncture.

17. The building structural connection of claim 16, wherein:
the length of elongated slot in the second plate closest to the angular juncture is longer than the respective length of the elongated slot in the second plate farthest from the angular juncture.

18. The building structural connection of claim 16, wherein:
the additional fastener anchoring member is one or more additional fasteners placed in the elongated slot that is closest to the angular juncture, and the one or more additional fasteners are also received by the second structural member.

19. The building structural connection of claim 16, wherein:
a. said first structural member is horizontally disposed member, and
b. said second structural member is a vertically disposed member that is part of a wall.

* * * * *